(12) United States Patent
Khalid et al.

(10) Patent No.: US 10,819,967 B2
(45) Date of Patent: Oct. 27, 2020

(54) METHODS AND SYSTEMS FOR CREATING A VOLUMETRIC REPRESENTATION OF A REAL-WORLD EVENT

(71) Applicant: Verizon Patent and Licensing Inc., Arlington, VA (US)

(72) Inventors: Mohammad Raheel Khalid, Budd Lake, NJ (US); Ali Jaafar, Guttenburg, NJ (US); Denny Breitenfeld, Florham Park, NJ (US); Xavier Hansen, Parsippany, NJ (US); Christian Egeler, Roseland, NJ (US); Syed Kamal, South Plainfield, NJ (US); Lama Hewage Ravi Prathapa Chandrasiri, Franklin Park, NJ (US); Steven L. Smith, Putnam Valley, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/280,915

(22) Filed: Feb. 20, 2019

(65) Prior Publication Data
US 2019/0182471 A1    Jun. 13, 2019

Related U.S. Application Data

(63) Continuation of application No. 15/141,707, filed on Apr. 28, 2016, now Pat. No. 10,257,490.

(51) Int. Cl.
*H04N 13/122* (2018.01)
*H04N 13/243* (2018.01)
(Continued)

(52) U.S. Cl.
CPC .......... *H04N 13/122* (2018.05); *H04N 5/232* (2013.01); *H04N 5/23238* (2013.01); *H04N 5/247* (2013.01); *H04N 13/243* (2018.05)

(58) Field of Classification Search
CPC .. H04N 13/122; H04N 5/232; H04N 5/23238; H04N 5/247; H04N 13/243
See application file for complete search history.

(56) References Cited

U.S. PATENT DOCUMENTS 5,729,471 A * 3/1998 Jain ..................... H04N 13/139
                                                      725/131
7,034,791 B1 * 4/2006 Odom ..................... G09G 5/14
                                                      345/100
(Continued)

*Primary Examiner* — Dramos Kalapodas

(57) ABSTRACT

An exemplary virtual reality media provider system differentiates static objects depicted in two-dimensional video data from dynamic objects depicted in the two-dimensional video data. Based on the differentiating of the static objects from the dynamic objects, the virtual reality media provider system generates dynamic volumetric models of the surfaces of the static objects and the dynamic objects. The virtual reality media provider system updates the dynamic volumetric models of the surfaces of the static objects with a lower regularity or on an as-needed basis, and the virtual reality media provider system separately updates the dynamic volumetric models of the surfaces of the dynamic objects with a higher regularity. The higher regularity is higher than the lower regularity and keeps the dynamic volumetric models of the surfaces of the dynamic objects up-to-date with what is occurring in the two-dimensional video data. Corresponding methods and systems are also disclosed.

20 Claims, 12 Drawing Sheets

(51) Int. Cl.
*H04N 5/232* (2006.01)
*H04N 5/247* (2006.01)

(56) References Cited

U.S. PATENT DOCUMENTS

| | | | |
|---|---|---|---|
| 7,583,275 B2 | 9/2009 | Neumann et al. | |
| 7,614,748 B2 * | 11/2009 | Nayar | H04N 13/305 353/7 |
| 2002/0158873 A1 | 10/2002 | Williamson | |
| 2010/0026712 A1 * | 2/2010 | Aliprandi | H04N 13/111 345/629 |
| 2011/0053688 A1 * | 3/2011 | Crawford | A63D 5/04 463/31 |
| 2012/0069131 A1 * | 3/2012 | Abelow | G06Q 10/067 348/14.01 |
| 2012/0194517 A1 | 8/2012 | Izadi et al. | |
| 2012/0212509 A1 * | 8/2012 | Benko | G06F 3/033 345/633 |
| 2013/0117377 A1 * | 5/2013 | Miller | A63F 13/12 709/205 |
| 2013/0328927 A1 | 12/2013 | Mount et al. | |
| 2016/0323565 A1 | 11/2016 | Van Baarsen et al. | |

\* cited by examiner

METHODS AND SYSTEMS FOR CREATING A VOLUMETRIC REPRESENTATION OF A REAL-WORLD EVENT

RELATED APPLICATIONS

This application is a continuation application of U.S. patent application Ser. No. 15/141,707, filed Apr. 28, 2016, and entitled "Methods and Systems for Creating and Providing a Volumetric Representation of a Real-World Event," which is hereby incorporated by reference in its entirety.

BACKGROUND INFORMATION

Advances in computing and networking technology have made new forms of media content possible. For example, virtual reality media content is available that may immerse viewers (or "users") into interactive virtual reality worlds that the users may experience by directing their attention to any of a variety of things being presented in the immersive virtual reality world at the same time. For example, at any time during the presentation of the virtual reality media content, a user experiencing the virtual reality media content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world from a particular viewpoint (e.g., vantage point) within the immersive virtual reality world.

In some examples, a virtual reality media provider may provide virtual reality content that includes an immersive virtual reality world representative of a real-world event (e.g., a sporting event, a concert, etc.) that may be taking place in real time (i.e., a live event). By tuning into a virtual reality broadcast of the real-world event, a user may experience the real-world event by looking around the immersive virtual reality world (e.g., the venue where real-world event is taking place) at will during the real-world event. However, traditional virtual reality media content may limit the user to experiencing the immersive virtual reality world from one or more static viewpoints within the immersive virtual reality world.

For example, the user may be free to look around the immersive virtual reality world in any direction from one or more static locations at the real-world event (e.g., static locations where creators of the virtual reality media content choose to position cameras capturing the real-world event), but the user may be unable to experience the immersive virtual reality world from other locations at the real-world event (e.g., locations where no camera is positioned). In many cases, some of the locations of most interest to users may be locations where cameras cannot be positioned without interfering with the real-world event (e.g., on the field of a sporting event, on stage at a concert, etc.). Accordingly, the static viewpoints may limit the freedom of the user to experience the real-world event from the most desirable viewpoints and/or may otherwise detract from the user experience in the immersive virtual reality world.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
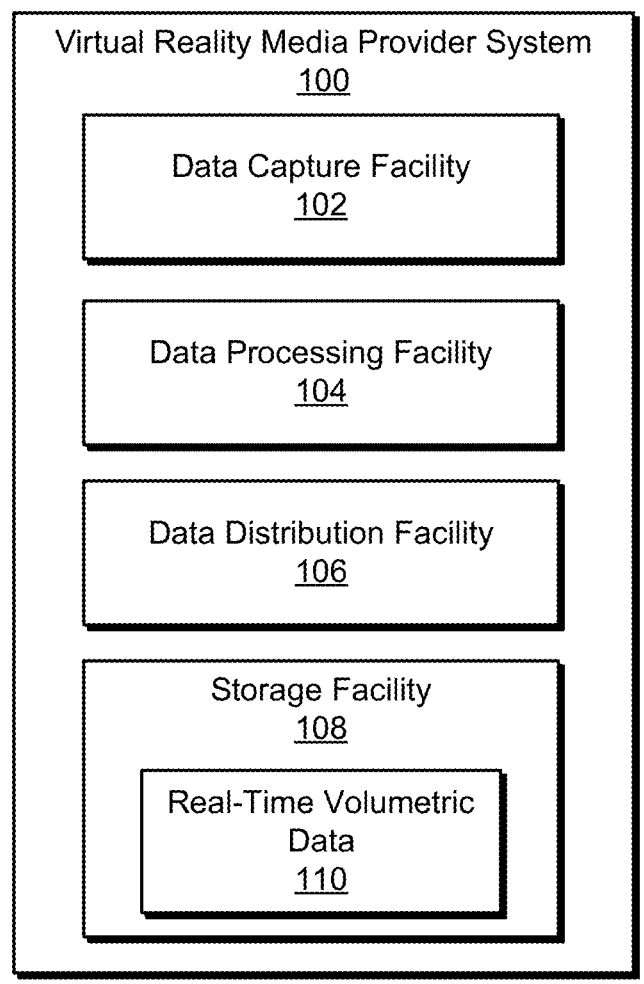
FIG. 1 illustrates an exemplary virtual reality media provider system that may create and provide a real-time volumetric representation of a real-world event according to principles described herein.

Methods and systems for creating and providing a volumetric representation of a real-world event are described herein. For example, the real-world event may be occurring live (e.g., in real time) and the volumetric representation of the real-world event may be a real-time volumetric data stream representative of a dynamic volumetric model of the surfaces of objects at the real-world event. As will be described and illustrated below, a virtual reality media provider system may include a configuration of synchronous video and depth capture devices (e.g., video cameras, three-dimensional ("3D") depth scanning hardware, etc.) disposed at fixed positions at a real-world event. The real-world event may be any event that takes place in the real-world (i.e., as opposed to taking place only in a virtual world). For example, the real-world event may be a sporting event (e.g., a basketball game, an Olympic event, etc.), a concert (e.g., a rock concert in a large venue, a classical chamber concert in an intimate venue, etc.), a theatrical presentation (e.g., a Broadway musical, an outdoor pageant, etc.), a large-scale celebration (e.g., New Year's Eve on Times Square, Mardis Gras, etc.), a race (e.g., a stock-car race, a horse race, etc.), a political event (e.g., a presidential debate, a political convention, etc.), or any other real-world event that may interest potential viewers. The real-world event may take place at any indoor or outdoor real-world location.

The configuration of synchronous video and depth capture devices disposed at the fixed positions at the real-world event may be configured to capture two-dimensional ("2D") video data as well as depth data for surfaces of objects at the real-world event. As used herein, "2D video data" may broadly include any data representative of how a real-world subject (e.g., a real-world scene, one or more objects at a real-world event, etc.) may appear over a particular time period and from at least one vantage point of at least one device capturing the 2D video data. 2D video data is not limited to any particular format, file type, frame rate, resolution, quality level, or other characteristic that may be associated with various definitions and/or standards defining video in the art. In certain examples, 2D video data may include a captured sequence of images (e.g., high-resolution still images) representative of an object at a real-world event over a particular time period. As used herein, "depth data" may broadly include any data representative of a position of a real-world subject (e.g., one or more objects at a real-world event) in 3D space. As will be described in more detail below, depth data may be captured based solely on 2D video data (e.g., by combining 2D video data captured from different vantage points using a suitable depth capture technique) or by using techniques that may require additional depth capture equipment and/or data such as specialized depth capture devices that provide time-of-flight data, infrared imaging data, and the like. In certain examples, 2D video data may be synchronized with depth data such that dynamic volumetric models of the surfaces of objects that incorporate the 2D video data and the depth data across a period of time may be generated.

Accordingly, video and depth capture devices may capture 2D video data and depth data in any suitable way and using any suitable devices as may serve a particular implementation. Specifically, as will be described in more detail below, in certain examples, video and depth capture device may consist of video cameras or other types of image capture devices that may capture 2D video data of objects at a real-world event from multiple vantage points from which depth data for the surfaces of the objects may be captured (e.g., derived) by using one or more depth capture techniques (e.g., triangulation-based depth capture techniques) described herein. In other examples, as will also be described in more detail below, video and depth capture devices may include video cameras or other types of image capture devices configured to capture the 2D video data, as well as separate depth capture devices configured to capture the depths of the surface of the objects using one or more of the depth capture techniques described below (e.g., time-of-flight-based depth capture techniques, infrared-based depth capture techniques, etc.). In the same or other examples, video and depth capture devices may include combination devices that include video camera devices and specialized depth capture devices combined together in single devices that are similarly configured to capture the depth data using one or more depth capture techniques described here. Additionally, the configuration of synchronous video and depth capture devices may continuously capture the 2D video data and the depth data in time, such that the surfaces of objects at the real-world event may be modeled in all four dimensions of space and time.

As used herein, an "object" may include anything that is visible (i.e., non-transparent) from a particular viewpoint at a real-world event, whether living or inanimate. For example, as will be described below, if the real-world event is a basketball game, objects for whose surfaces the video and depth capture devices may capture 2D video data and depth data may include the basketball being used for the game, the basketball court, the basketball standards (i.e., the backboards, rims, nets, etc.), the players and referees participating in the game, and/or other objects present at and/or associated with the basketball game.

The video and depth capture devices may capture the 2D video data and depth data in real-time (e.g., as the basketball game is being played) so that virtual reality media content representative of the real-world event (e.g., the basketball game) may be distributed to users to experience live, as will be described below.

Based on the captured depth data and the captured 2D video data from the video and depth capture devices, the virtual reality media provider system may generate a real-time volumetric data stream representative of a dynamic volumetric model of the surfaces of the objects at the real-world event. A dynamic volumetric model of an object may include and/or be generated based both on 1) depth data representing where and how the object is positioned in 3D space at a particular time, or with respect to time over a particular time period, and on 2) synchronous 2D video data mapped onto a positional model (e.g., a wireframe model of the object derived from the depth data) to represent how the object appeared at the particular time or with respect to time over the particular time period. As such, dynamic volumetric models may be 3D models including three spatial dimensions or four-dimensional ("4D") models that include the three spatial dimensions as well as a temporal dimension. The generation of the real-time volumetric data stream may also be performed in real time such that users not physically present at the real-world event may be able to experience the real-world event live, in real time, via virtual reality media content representative of the real-world event. Examples of real-time volumetric data streams that include dynamic volumetric models and techniques for creating and distributing real-time volumetric data streams with dynamic volumetric models will be described below.

In some examples, the dynamic volumetric model of the surfaces of the objects at the real-world event may be configured to be used to generate virtual reality media content representative of the real-world event. The virtual reality media content may be generated by the virtual reality media provider system and/or by another system operated by the virtual reality media provider or by a separate entity (e.g., a virtual reality media content distributor associated with the virtual reality media provider). Accordingly, virtual reality media content may be generated and/or distributed (e.g., provided to one or more media player devices) by any suitable system (e.g., by the virtual reality media provider system, a system associated with a virtual reality media content distributor, etc.) based on the real-time volumetric data stream (i.e., based on the dynamic volumetric model of the surfaces of the objects at the real world event). For example, the virtual reality media provider system may provide the virtual reality media content to one or more media player devices associated with respective users who may not be physically present at the real-world event but who wish to experience the real-world event virtually using their media player devices. As mentioned above, it may be desirable for the users who are not attending the real-world event to experience the real-world event live (e.g., in real time as it is occurring with as small a delay as possible). Accordingly, the virtual reality media provider system may provide the virtual reality media content representative of the real-world event to the media player devices in real time.

While data processing and data distribution may take a finite amount of time such that it is impossible for a user to experience real-world events precisely as the real-world events occurs, as used herein, an operation (e.g., providing the virtual reality media content) is considered to be performed "in real time" when the operation is performed immediately and without undue delay. Accordingly, a user may be said to experience a real-world event in real time even if the user experiences particular occurrences within the event (e.g., a particular shot in a basketball game) a few seconds or minutes after the occurrences actually take place at the real-world event. Certain methods and systems disclosed herein may be specially adapted to support real-time dynamic volumetric modeling and experiencing of immersive virtual reality worlds based on live real-world events. For example, powerful hardware resources (e.g., multiple servers including multiple processing units) may be employed to perform the immense processing required for real-time creation and distribution of immersive virtual reality worlds based on real-time volumetric data streams representative of dynamic volumetric models of the surfaces of objects at the real-world event. Moreover, particular techniques for capturing 2D video data and depth data (e.g., such as techniques described below) or for distinguishing and separately modeling different types of objects (e.g., static, dynamic, and background objects as described below) may further facilitate and/or enable the immense processing to be performed in real-time.

As mentioned above, it may be undesirable for a user experiencing a real-world event virtually (e.g., using a media player device to present virtual reality media content provided by a virtual reality media provider system) to be limited to one or more discrete positions within the immersive virtual reality world representative of the real-world event. As such, the virtual reality media provider system may provide the virtual reality media content representative of the real-world event as experienced from a dynamically selectable viewpoint corresponding to an arbitrary location at the real-world event. The dynamically selectable viewpoint may be selected by the user of the media player device while the user is experiencing the real-world event using the media player device.

As used herein, an "arbitrary location" may refer to any point in space at the real-world event. For example, arbitrary locations are not limited to fixed positions where video and depth capture devices may be disposed at the real-world event, but also include all the positions between the video and depth capture devices and even places where video and depth capture devices may not be able to be positioned. Moreover, arbitrary locations may not be limited to aligning with a viewing angle (i.e., an angle of capture) of any video and depth capture device in the configuration of synchronous video and depth capture device at the real-world event. In some examples, such arbitrary locations (i.e., that do not directly align with a viewing angle of any video and depth capture device) may correspond to the most desirable viewpoints at the real-world event. For instance, in the basketball game example presented above, video and depth capture devices may not be allowed to be positioned in the middle of the basketball court because the video and depth capture devices would interfere with gameplay of the basketball game.

In contrast, the user may dynamically select viewpoints from which to experience the game that are in any arbitrary location on the basketball court. For example, the user may dynamically select his or her viewpoint to follow the basketball up and down the basketball court and experience the basketball game as if standing on the basketball court in the middle of the action of the game. In other words, for example, while video and depth capture devices may be positioned at fixed positions surrounding the basketball court, but may not be positioned directly on the court so as not to interfere with gameplay of the basketball game, the user may dynamically select viewpoints from which to experience the game that are in any arbitrary location on the basketball court.

By creating and providing a real-time volumetric representation of a real-world event that allows users to dynamically select an arbitrary viewpoint from which to experience a real-world event as described herein, a virtual reality media provider system may facilitate users becoming immersed in real-world events to an extent that may not be possible for people watching the real-world events using traditional media (e.g., television) or even experiencing the real-world events using traditional virtual reality media. Moreover, the ability of users to dynamically and arbitrarily move their viewpoint within the real-world event may provide the users with an experience of the real-world event not even available to physical attendees of the real-world event. For example, users may be able to experience a live basketball game as if running up and down the court with the players, or experience a live concert as if standing on stage next to the performers.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual reality media provider system 100 ("system 100") that may create and provide a real-time volumetric representation of a real-world event in accordance with methods and systems described herein for. As shown, system 100 may include, without limitation, a data capture facility 102, a data processing facility 104, a data distribution facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. Each of facilities 102 through 108 may include or be housed in a device (e.g., having a single chassis) and located at a single location or distributed between multiple devices and/or multiple locations as may serve a particular implementation. Each of facilities 102 through 108 will now be described in more detail.

Data capture facility 102 may include any hardware and/or software (e.g., computing systems, video and depth capture equipment, software programs, etc.) used for capturing data associated with attributes of objects at a real-world event. For example, data capture facility 102 may include a configuration of synchronous video and depth capture devices such as 2D video cameras, 3D depth scanners, combination video-depth capture devices (e.g., devices configured to capture both 2D video and associated depth data), and so forth. Examples of video and depth capture devices will be described in more detail below. Data capture facility 102 may be used to capture two-dimensional video data and depth data for surfaces of objects at a real-world event in any way described herein and/or as may serve a particular implementation.

Data processing facility 104 may include any hardware and/or software (e.g., computing systems, software programs, etc.) used for processing the data captured by data capture facility 102 and/or for generating a real-time volumetric data stream of a dynamic volumetric model of the surfaces of the objects at the real-world event. For example, data processing facility 104 may include one or more server systems or other computing devices running specialized and/or general-purpose image processing software, 3D modeling software, and so forth. Examples of how data processing facility 104 may process captured data and generate a real-time volumetric data stream based on the captured data will be described below. Data processing facility 104 may also generate virtual reality media content representative of the real-world event based on the real-time volumetric data stream.

Data distribution facility 106 may include any hardware and/or software (e.g., computing systems, networking systems, software programs, etc.) used for distributing data processed (e.g., generated) by data processing facility 104 and/or for providing virtual reality media content representative of the real-world event (e.g., virtual reality media content generated by data processing facility 104) as experienced from a dynamically selectable viewpoint corresponding to an arbitrary location at the real-world event. To this end, data distribution facility 106 may also receive data representative of user input (e.g., selections of dynamically selectable viewpoints corresponding to arbitrary locations at the real-world event) from users experiencing the real-world event using media player devices to present the virtual reality media content.

Storage facility 108 may maintain real-time volumetric data 110 and/or any other data received, generated, managed, maintained, used, and/or transmitted by facilities 102 through 106. Real-time volumetric data 110 may include data representing a dynamic volumetric model of the surfaces of the objects at the real-world event generated by data processing facility 104 from 2D video data and/or depth data captured by data capture facility 102. Real-time volumetric data 110 may include a complete, real-time, volumetric (e.g., 3D) model of the real-world event (e.g., a four-dimensional model), any part of which may be presented to a user from any arbitrary viewpoint selected by the user. As such, system 100 may provide virtual reality media content representative of the real-world event as experienced from a dynamically selectable viewpoint corresponding to an arbitrary location at the real-world event by providing different parts of real-time volumetric data 110 to different media player devices based on dynamically selectable viewpoints that are selected by different respective users of the media player devices. Storage facility 108 may further include any other data as may be used by facilities 102 through 106 to create and provide the real-time volumetric representation of the real-world event as may serve a particular implementation.

Figure 2:
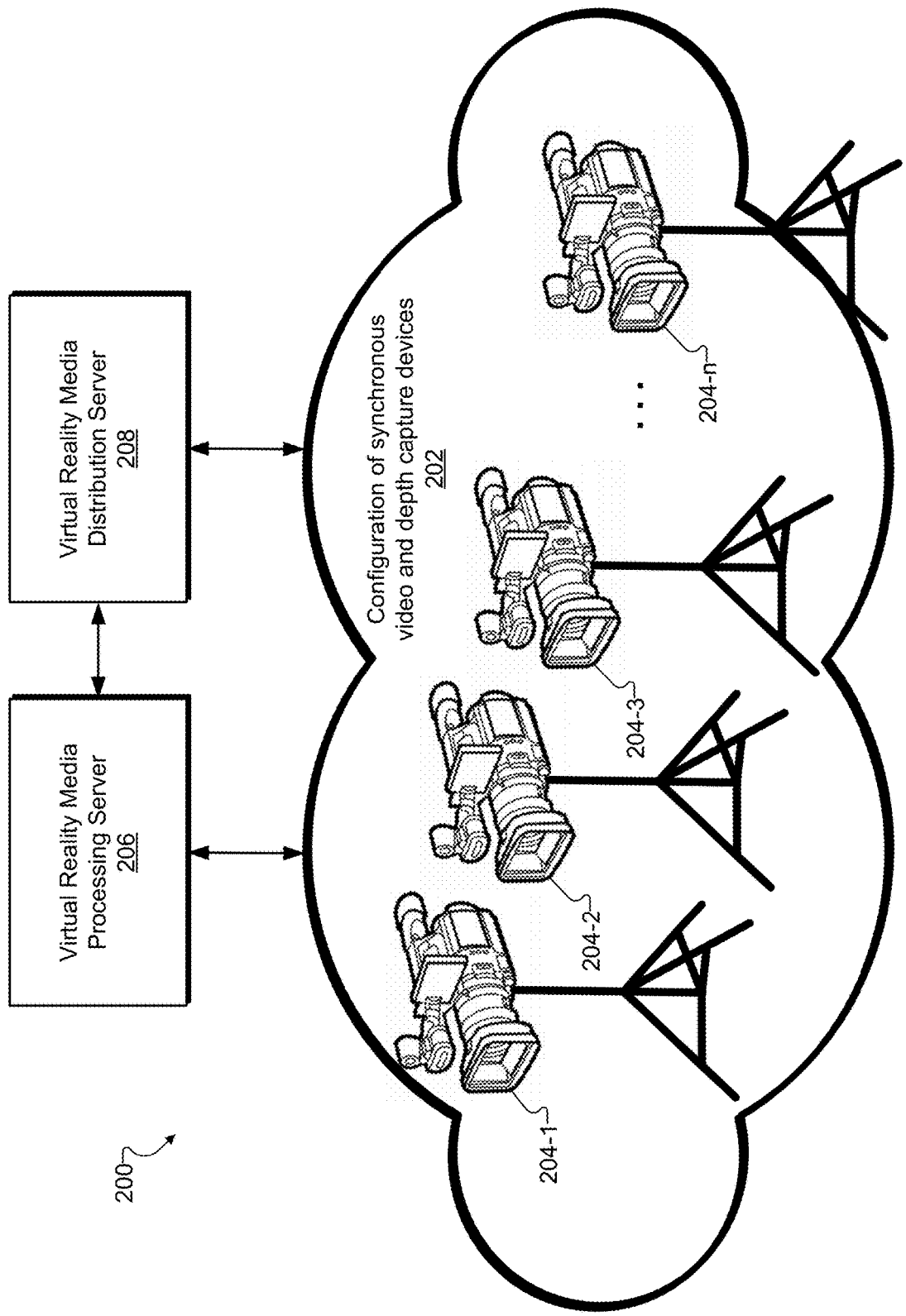
FIG. 2 illustrates an exemplary implementation of the virtual reality media provider system of FIG. 1 according to principles described herein.

FIG. 2 illustrates an exemplary implementation 200 of system 100 shown in FIG. 1. As shown, implementation 200 includes a configuration 202 of synchronous video and depth capture devices 204 (e.g., video and depth capture devices 204-1 through 204-n). Implementation 200 further includes a virtual reality media processing server 206 and a virtual reality media distribution server 208 communicatively coupled to configuration 202.

In configuration 202, synchronous video and depth capture devices 204 ("capture devices 204") may be disposed (i.e. located, installed, etc.) at fixed positions at a real-world event in any way that may serve a particular implementation. For example, as will be illustrated and described below, configuration 202 may include capture devices 204 at fixed positions surrounding a real-world event or one or more portions thereof (e.g., surrounding a field of play of a sporting event such as a basketball court at a basketball game).

Each capture device 204 may include one or more devices or components configured to continuously capture 2D video and/or depth data as may serve a particular implementation. For example, each capture device 204 may include a first component (e.g., a video camera device) configured to capture 2D video of objects at which the first component is directed (e.g., pointed), and a second component (e.g., a depth camera device, a 3D imaging or 3D scanning device, etc.) configured to capture depth data of objects at which the second component is directed. Is this example, the first component and the second component may be separate or discrete devices, but may be communicatively coupled and configured to work in conjunction with one another to simultaneously and synchronously capture both the 2D video data and the depth data.

In other examples, each capture device 204 may comprise a combination video-depth capture device (e.g., a specially-designed video camera) that is configured to capture both the 2D video data and the depth data. In other words, both the 2D video data and the depth data may be captured using the same combination video-depth capture device. The combination video-depth capture device may be a commercially available or specially-designed video camera capable of not only capturing video data but also detecting corresponding depth of objects represented in the video data using one of the depth capture techniques described herein or another suitable technique. Similarly, as mentioned above, in examples where a depth capture technique being used relies only on 2D video data (e.g., certain triangulation-based depth capture techniques), capture devices 204 may not include any specialize depth capture equipment or capability (e.g., time-of-flight equipment, infrared sensing equipment, etc.) but, rather, may only include video capture devices and/or other similar types of image capture devices.

In some examples, capture devices 204 may have a limited viewing angle (e.g., 90 degrees, 120 degrees, etc.) designed to capture data from objects at the real-world event in a specific area. For example, a ring configuration of capture devices 204 with limited viewing angles may surround a real-world event or one or more portions thereof (e.g., a basketball court, turns on a racetrack) and be pointed inwardly to capture objects at the real-world event (e.g., on the basketball court, the turns of the racetrack, etc.). In the same or other examples, at least one particular capture device 204 may have a 360-degree viewing angle to capture data from objects surrounding the particular capture device 204. For example, at least one of capture devices 204 may be a 360-degree camera configured to capture and/or generate a 360-degree video image of the real-world event around a center point corresponding to the 360-degree camera.

As used herein, a 360-degree video image is any video image that depicts the surroundings of a center point (e.g., a center point associated with the location of one of capture devices 204 such as a 360-degree camera) on all sides along at least one dimension. For example, one type of 360-degree video image may include a panoramic video image that depicts a complete 360-degree by 45-degree ring around a center point corresponding to the camera. Another type of 360-degree video image may include a spherical video image that depicts not only the ring around the center point, but an entire 360-degree by 180-degree sphere surrounding the center point on all sides. In certain examples, a 360-degree video image may be based on a non-circular geometric structure. For example, certain 360-degree video images may be based on cubes, rectangular prisms, pyramids, and/or other geometric structures that may serve a particular implementation, rather than being based on spheres.

The 360-degree camera may be configured to capture a very wide-angle video image (e.g., using one or more "fish-eye" lenses to capture a spherical or semi-spherical image) or to capture a plurality of raw video images from each of a plurality of segment capture cameras built into or otherwise associated with the 360-degree camera. In some examples, the 360-degree camera may generate the 360-degree video image of the real-world event by combining (e.g., stitching together) the plurality of video images captured by the segment capture cameras. In other examples, the 360-degree camera may send raw video image data to one or more servers (e.g., virtual reality media processing server 206) and the raw video images may be combined into a 360-degree (e.g., spherical) video image by the one or more servers.

Capture devices 204 within configuration 202 may be communicatively coupled to one another (e.g., networked together) and/or communicatively coupled to another device (e.g., virtual reality media processing server 206). This may allow the devices to maintain synchronicity in time, position, angle, etc. so that a dynamic volumetric model of the surfaces of the objects at the real-world event may be properly generated. For example, capture devices 204 may send and receive timing signals to ensure that each of capture device 204 captures corresponding data at the same time and that the data captured by different capture devices 204 may be timestamped with a universal time shared by all of capture devices 204 in configuration 202.

Virtual reality media processing server 206 may perform any of the data processing operations described herein. For example, virtual reality media processing server 206 may be associated with (e.g., may implement all or a portion of or may be contained within) data processing facility 104 and/or storage facility 108 of system 100. As such, virtual reality media processing server 206 may receive captured data from configuration 202 of capture device 204 and may use the captured data to generate a real-time volumetric data stream representative of a dynamic volumetric model of the surfaces of the objects at the real-world event in any way that may serve a particular implementation.

Virtual reality media distribution server 208 may perform any of the data distribution operations described herein. For example, virtual reality media distribution server 208 may be associated with (e.g., implementing all or a portion of, or being contained within) data distribution facility 106 and/or storage facility 108 of system 100. As such, virtual reality media distribution server 208 may receive captured data from configuration 202 and/or processed data (e.g., the real-time volumetric data stream and/or virtual reality media content based on the real-time volumetric data stream) from virtual reality media processing server 206, and may distribute the captured and/or processed data to other devices. For example, virtual reality media distribution server 208 may provide virtual reality media content representative of the real-world event (e.g., based on the real-time volumetric data stream) to media player devices associated with users (not explicitly shown in FIG. 2).

Figure 3:
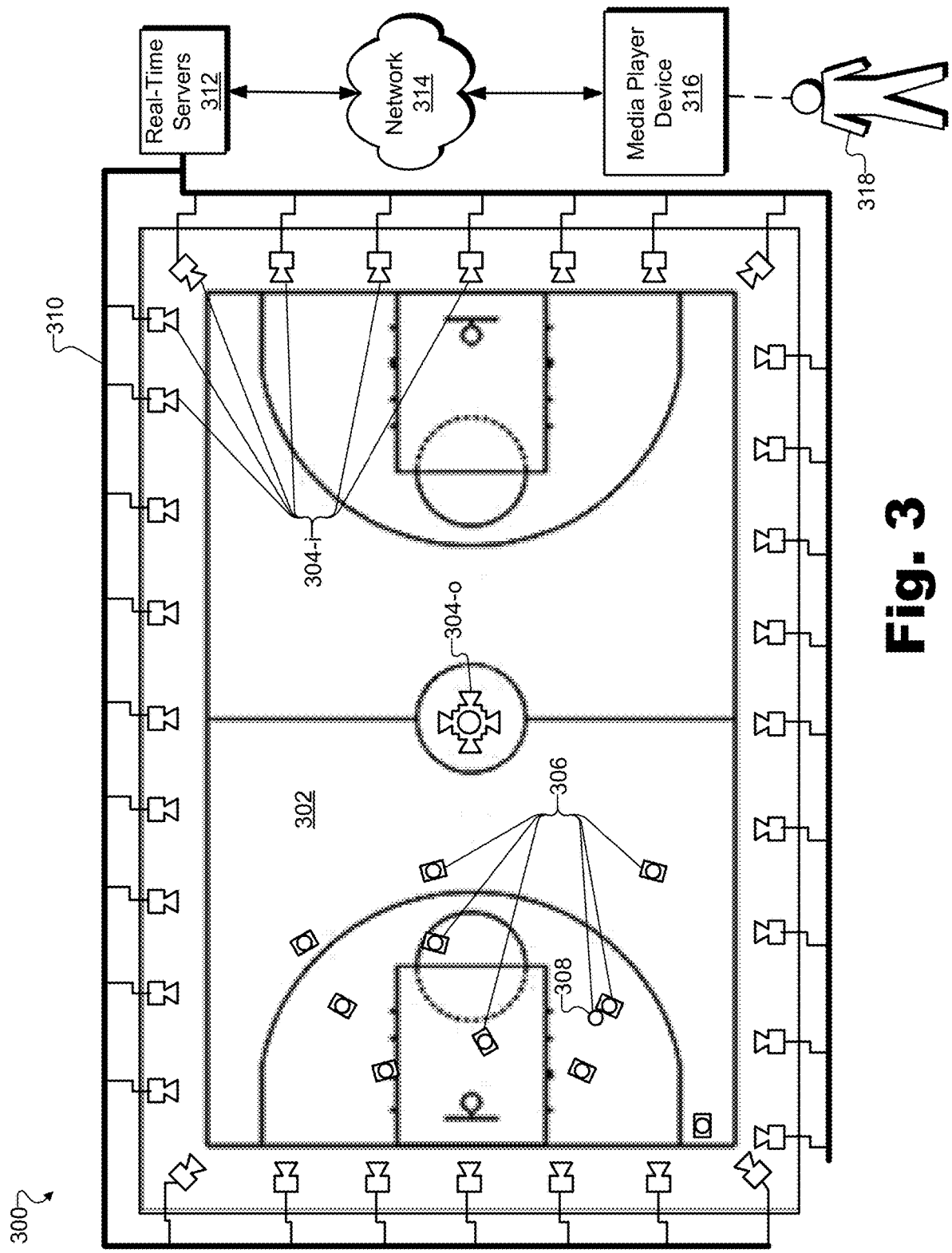
FIG. 3 illustrates an exemplary configuration in which the virtual reality media provider system of FIG. 1 operates to create a volumetric representation of an exemplary real-world event according to principles described herein.

FIG. 3 illustrates an exemplary configuration 300 in which system 100 operates to create a volumetric representation of an exemplary real-world event. In the example of FIG. 3, the real-world event is a basketball game. As shown in configuration 300, a stage space 302 of the real-world event (e.g., a basketball court) may be surrounded by inward-facing synchronous video and depth capture devices 304-i, and may surround at least one outward-facing video and depth capture device 304-o (collectively referred to as "capture devices 304"). Capture devices 304 may be configured to capture 2D video data and depth data in real time for surfaces of objects 306 at the real-world event (e.g., players, the basketball, etc.). Basketball 308 is specifically called out in configuration 300 as a particular example of an object 306 because a detailed example of creating a dynamic volumetric model will be provided below with respect to basketball 308.

As further shown in configuration 300, capture devices 304 may be communicatively coupled by cables 310 and/or by other means (e.g., wireless networking means) to one another and/or to one or more real-time servers 312. Real-time servers 312, in turn are communicatively coupled by a network 314 to one or more media player devices associated with one or more respective users, including a media player device 316 associated with a user 318. Certain components in configuration 300 will now be described in more detail.

Stage space 302 may include any portion of a real-world event that is targeted by a virtual reality media provider as being of interest to potential virtual reality viewers (e.g., such as user 318). For example, if, as in the example of FIG. 3, the real-world event is a basketball game, the real-world event may be the entire basketball arena where the game is taking place (e.g., including the seating areas, etc.) while stage space 302 may include only the basketball court itself and the space above the basketball court where the game is played. In other examples, stage space 302 may include a stage where performers (e.g., actors in a play, musicians at a concert, etc.) are performing, or other relevant areas of interest (e.g., specific turns and/or the finish line on a racetrack) depending on the nature of the real-world event, the level of user interest in the real-world event, the financial resources and priorities of the virtual reality media provider capturing the real-world event, and any other factors that may serve a particular implementation.

In some examples, the fixed positions at the real-world event where capture devices 304 are disposed include fixed positions outside of stage space 302 (e.g., off of the basketball court) while objects 306 that capture devices 304 may be directed at and for which dynamic volumetric models may be created and provided may be within stage space 302 (e.g., on the basketball court). However, as described above, user 318 may select dynamically selectable viewpoints at arbitrary locations within stage space 302 from which to experience the real-world event.

Capture devices 304 may be the same or similar to capture devices 204, described above in relation to FIG. 2. As shown, capture devices 304 may be disposed at fixed positions at the real-world event such as surrounding stage space 302 (in the case of capture devices 304-i) and/or in the middle of stage space 302 (in the case of capture device 304-o). Thus, as described above, capture devices 304-i may have limited viewing angles but may be directed inward to continuously capture details of what is happening in stage space 302. Conversely, capture device 304-o may be a 360-degree outward facing synchronous video and depth capture device (e.g., a 360-degree camera) configured to continuously capture 360-degree 2D video data and depth data for surfaces of objects 306 within stage space 302, as well as for objects 306 visible at the real-world event but that are outside of stage space 302. For example, capture device 304-o may continuously capture data representative of objects in the spectator seating areas at the venue in which the basketball game is taking place. Because capture device 304-o may not be able to be positioned directly within stage space 302 (i.e., because it would interfere with the basketball game), capture device 304-o may be suspended above stage space 302 or otherwise positioned as may serve a particular implementation.

A configuration of capture devices 304 may include any suitable number of cameras as may serve a particular implementation. For example, the number and position of capture devices 304 may be determined based on a target quality level a virtual reality media provider strives to provide and/or based on a minimum number of cameras to reasonably capture data from objects 306 from enough angles to be able to adequately generate the dynamic volumetric model of the surfaces of objects 306. In other words, even when objects 306 are dynamically moving around within stage space 302 such that one object 306 may completely or partially block the view of another object 306 from the angle of a first capture device 304, the number and placement of capture devices 304 may ensure that a second capture device 304 will have a better angle with which to capture data for the blocked object 306 than does the first capture device 304.

Objects 306 may include any objects at the real-world event inside or outside stage space 302. For example, objects 306 may include people on the court (e.g., basketball players, referees, and other people on the basketball court), basketball 308, and/or other living and/or inanimate objects such as basketball standards (i.e., backboards, rims, nets, etc.), the floor of the basketball court, people and/or furniture on the sidelines of the basketball game, spectators and seating areas surrounding the basketball court, and the like. A specific example of how 2D video data and depth data may be captured and used to generate a real-time volumetric data stream including a dynamic volumetric model of basketball 308 will be described below.

Real-time servers 312 may include any components described herein that may perform operations for creating and providing a real-time volumetric representation of the basketball game real-world event. For example, real-time servers 312 may include a plurality of powerful server systems (e.g., having multiple graphics processing units) that implement system 100 and/or any of the systems or facilities described in relation to system 100 in FIG. 1 or 2 or hereafter. In particular, real-time servers 312 may receive captured data from capture devices 304 and generate a real-time volumetric data stream representative of a dynamic volumetric model of the surfaces of objects 306. Real-time servers 312 may then generate and provide virtual reality media content to media player device 316 in real time (e.g., over network 314).

Network 314 may include any provider-specific wired or wireless network (e.g., a cable or satellite carrier network or a mobile telephone network), the Internet, wide area network, or any other suitable network. Data may flow between real-time servers 312, or between real-time servers 312 and media player device 316 using any communication technologies, devices, media, and protocols as may serve a particular implementation. For example, real-time servers 312 may communicate with one another or with media player device 316 using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Markup Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies. While only one network 314 is shown to interconnect real-time servers 312 and media player device 316 in FIG. 3, it will be recognized that these devices and systems may intercommunicate by way of multiple interconnected networks as may serve a particular implementation.

Media player device 316 may be used by user 318 to access and experience virtual reality media content received from system 100 (e.g., from real-time servers 312). To this end, media player device 316 may include or be implemented by any device capable of presenting a field of view of an immersive virtual reality world (e.g., an immersive virtual reality world representative of the real-world event) and detecting user input from user 318 to dynamically update a scene of the immersive virtual reality world presented within the field of view as user 318 experiences the immersive virtual reality world.

For example, the field of view may provide a window through which user 318 may easily and naturally look around the immersive virtual reality world. The field of view may be presented by media player device 316 (e.g., on a display screen of media player device 316) and may include video depicting objects surrounding the user within the immersive virtual reality world. Additionally, the field of view may dynamically change in response to user input provided by the user as the user experiences the immersive virtual reality world. For example, the media player device may detect user input (e.g., moving or turning the display screen upon which the field of view is presented). In response, the field of view may display different objects and/or objects seen from a different viewpoint (e.g., a viewpoint corresponding to the position of the display screen) in place of the objects seen from the previous viewpoint.

In some examples, media player device 316 may be configured to allow user 318 to select respective virtual reality media content programs (e.g., associated with different live real-world events, as well as other types of virtual reality media content programs) that user 318 may wish to experience. In certain examples, media player device 316 may download virtual reality media content programs that user 318 may experience offline (e.g., without an active connection to real-time servers 312). In other examples, media player device 316 may request and receive data streams representative of virtual reality media content programs that user 318 experiences while media player device 316 remains in active communication with real-time servers 312 (e.g., system 100) by way of network 314.

To facilitate user 318 in experiencing virtual reality media content, media player device 316 may include or be associated with at least one display screen (e.g., a head-mounted display screen built into a head-mounted virtual reality device or a display screen of a mobile device mounted to the head of the user with an apparatus such as a cardboard apparatus) upon which scenes of an immersive virtual reality world may be displayed. Media player device 316 may also include software configured to receive, maintain, and/or process data representative of the immersive virtual reality world to present the scenes of the immersive virtual reality world on the display screens of the media player devices. For example, media player device 316 may include dedicated, standalone software applications (e.g., mobile applications) configured to process and present data representative of immersive virtual reality worlds on the displays. In other examples, the software used to present the particular scenes of the immersive virtual reality worlds may include non-dedicated software such as standard web browser applications.

Media player device 316 may take one of several different form factors. For example, media player device 316 may include or be implemented by a head-mounted virtual reality device (e.g., a virtual reality gaming device) that includes a head-mounted display screen, by a personal computer device (e.g., a desktop computer, laptop computer, etc.), by a mobile or wireless device (e.g., a smartphone, a tablet device, a mobile reader, etc.), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 318.

Figure 4:
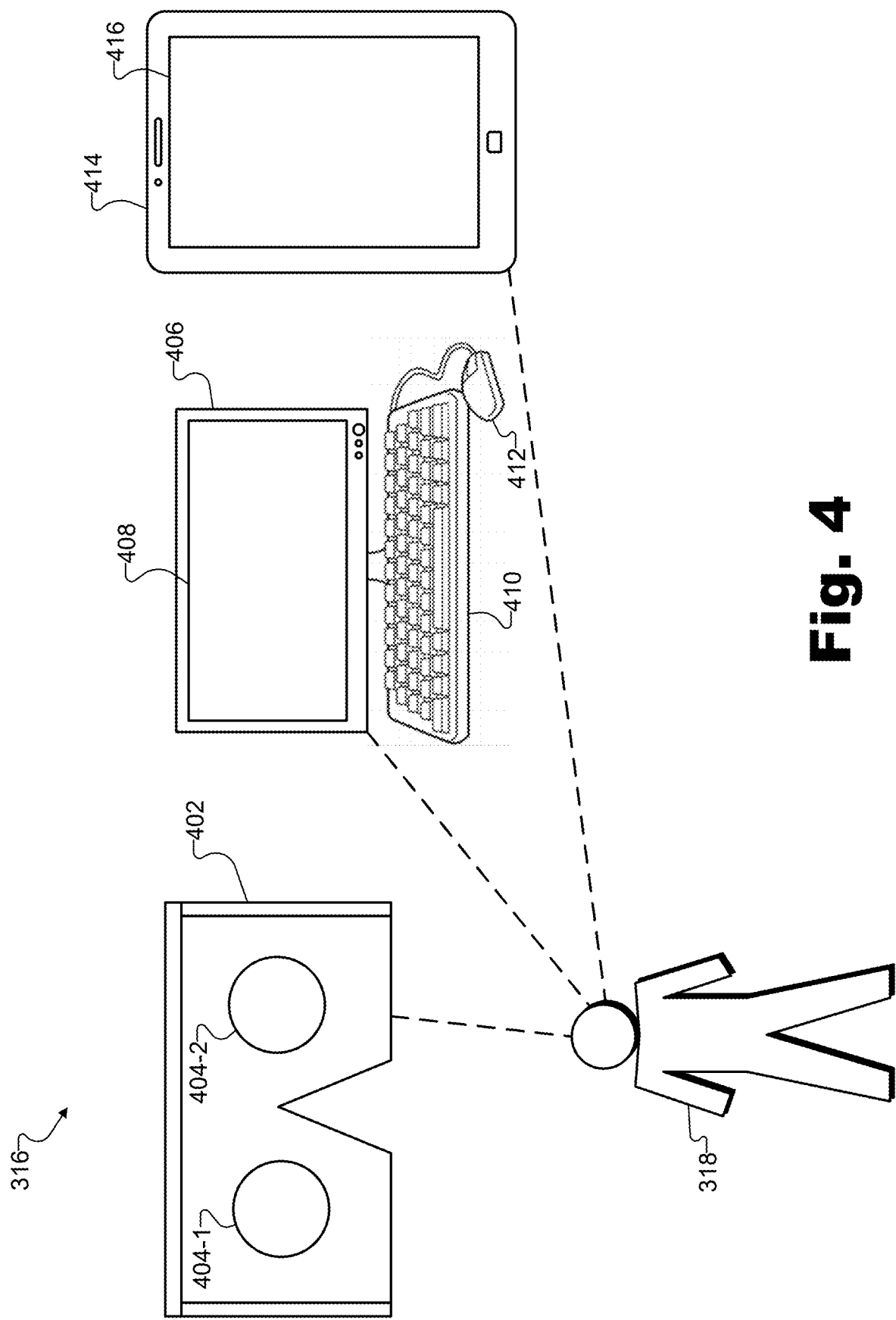
FIG. 4 illustrates exemplary media player devices configured to facilitate a user in experiencing an immersive virtual reality world based on a volumetric representation of a real-world event, where the volumetric representation of the real-world event is created and provided by a virtual reality media provider system according to principles described herein.

To illustrate, FIG. 4 shows different form factors of media player device 316 configured to facilitate user 318 in experiencing an immersive virtual reality world based on a volumetric representation of a real-world event created and provided to the media player devices by system 100 according to methods and systems described herein.

As one example, a head-mounted virtual reality device 402 may be mounted on the head of user 318 and arranged so that each of the eyes of user 318 sees a distinct display screen 404 (e.g., display screens 404-1 and 404-2) within head-mounted virtual reality device 402. In some examples, a single display screen 404 may be presented and shared by both eyes of user 318. In other examples, distinct display screens 404 within head-mounted virtual reality device 402 may be configured to display slightly different versions of a field of view of an immersive virtual reality world (e.g., representative of the real-world event). For example, display screens 404 may be configured to display stereoscopic versions of the field of view that may be captured by one or more stereoscopic cameras to give user 318 the sense that the immersive virtual reality world presented in the field of view is three-dimensional. Display screens 404 may also be configured to fill the peripheral vision of user 318, providing even more of a sense of realism to user 318.

Moreover, head-mounted virtual reality device 402 may include motion sensors (e.g., accelerometers), directional sensors (e.g., magnetometers), orientation sensors (e.g., gyroscopes), and/or other suitable sensors to detect natural movements (e.g., head movements) of user 318 as user 318 experiences the immersive virtual reality world. Thus, user 318 may provide input indicative of a desire to move the field of view in a certain direction and by a certain amount in the immersive virtual reality world by simply turning his or her head in that direction and by that amount. User 318 may use a physical console or controller to dynamically select a dynamically selectable viewpoint corresponding to an arbitrary location at the real-world event (e.g., a viewpoint on stage space 302) from which to experience (e.g., look around) the immersive virtual reality world representative of the real-world event.

As another example of a media player device 316, a personal computer device 406 having a display screen 408 (e.g., a monitor) may be used by user 318 to experience the immersive virtual reality world representative of the real-world event. Because display screen 408 may not provide the distinct stereoscopic view for each of the user's eyes and/or may not fill the user's peripheral vision, personal computer device 406 may not provide the same degree of immersiveness that head-mounted virtual reality device 402 provides. However, personal computer device 406 may be associated with other advantages such as its ubiquity among casual virtual reality users that may not be inclined to purchase or use a head-mounted virtual reality device. In some examples, personal computer device 406 may allow a user to experience virtual reality content within a standard web browser so that user 318 may conveniently experience the real-world event without using special devices or downloading special software. User 318 may provide user input to personal computer device 406 by way of a keyboard 410, a mouse 412, and/or any other such input device as may serve a particular implementation. For example, user 318 may use mouse 412 or navigation keys on keyboard 410 to move the field of view (i.e., to look around the immersive virtual reality world) and/or to dynamically select a dynamically selectable viewpoint within the real-world event from which to experience the real-world event (i.e., to "walk" or "fly" around within the immersive virtual reality world). In certain examples, a combination of keyboard 410 and mouse 412 may be used.

As yet another example of a media player device 316, a mobile device 414 having a display screen 416 may be used by user 318 to experience the immersive virtual reality world representative of the real-world event. Mobile device 414 may incorporate certain advantages of both head-mounted virtual reality devices and personal computer devices to provide the most versatile type of media player device for experiencing the immersive virtual reality world. Specifically, like personal computer devices, mobile devices are extremely ubiquitous, potentially providing access to many more people than dedicated head-mounted virtual reality devices. However, because many mobile devices are equipped with motion sensors, directional sensors, orientation sensors, etc., mobile devices may also be configured to provide user 318 with an immersive experience comparable to that provided by head-mounted virtual reality devices. For example, mobile device 414 may be configured to divide display screen 416 into two versions (e.g., stereoscopic versions) of a field of view and to fill the peripheral vision of user 318 when mobile device 414 is mounted to the head of user 318 using a relatively inexpensive and commercially-available mounting apparatus (e.g., a cardboard apparatus). In other embodiments, mobile device 414 may facilitate experiencing the immersive virtual reality world by receiving movement-based user input at arm's length (i.e., not mounted to the head of user 318 but acting as a hand-held dynamic window for experiencing the immersive virtual reality world), by receiving swipe gestures on a touchscreen, or by other techniques that may serve a particular embodiment.

While examples of certain media player devices have been described, the examples are illustrative and not limiting. A media player device may include any suitable device and/or configuration of devices configured to facilitate receipt and presentation of virtual reality media content according to principles described herein. For example, a media player device may include a tethered device configuration (e.g., a tethered headset device) or an untethered device configuration (e.g., a display screen untethered from a processing device). As another example, a head-mounted virtual reality media player device or other media player device may be used in conjunction with a virtual reality controller such as a wearable controller (e.g., a ring controller) and/or a handheld controller.

As mentioned above, it may be desirable for user 318 to experience a real-world event in real time (e.g., at the same time the real-world event is occurring or after a trivial period of delay). However, in certain examples, user 318 may wish to experience the real-world event in a time-shifted manner, rather than in real time. For example, if the real-world event begins at a particular time and user 318 tunes in to the virtual reality media content representative of the real-world event fifteen minutes late, user 318 may wish to experience the real-world event starting from the beginning (i.e., starting fifteen minutes before the time that user 318 tunes into the virtual reality media content representative of the real-world event). Alternatively, user 318 may be busy when the real-world event occurs and may wish to experience the real-world event later (e.g., the following day).

To this end, system 100 may store and maintain, subsequent to providing virtual reality media content representative of the real-world event in real time, a recording of the real-time volumetric data stream representative of the dynamic volumetric model of the surfaces of the objects at the real-world event. Then, when user 318 later wishes to experience the real-world event, system 100 may provide virtual reality media content representative of the real-world event as experienced from a dynamically selectable viewpoint corresponding to an arbitrary location at the real-world event selected by the user. For example, the virtual reality media content may provide the virtual reality media content to media player device 316 based on the recording of the real-time volumetric data stream.

Figure 5:
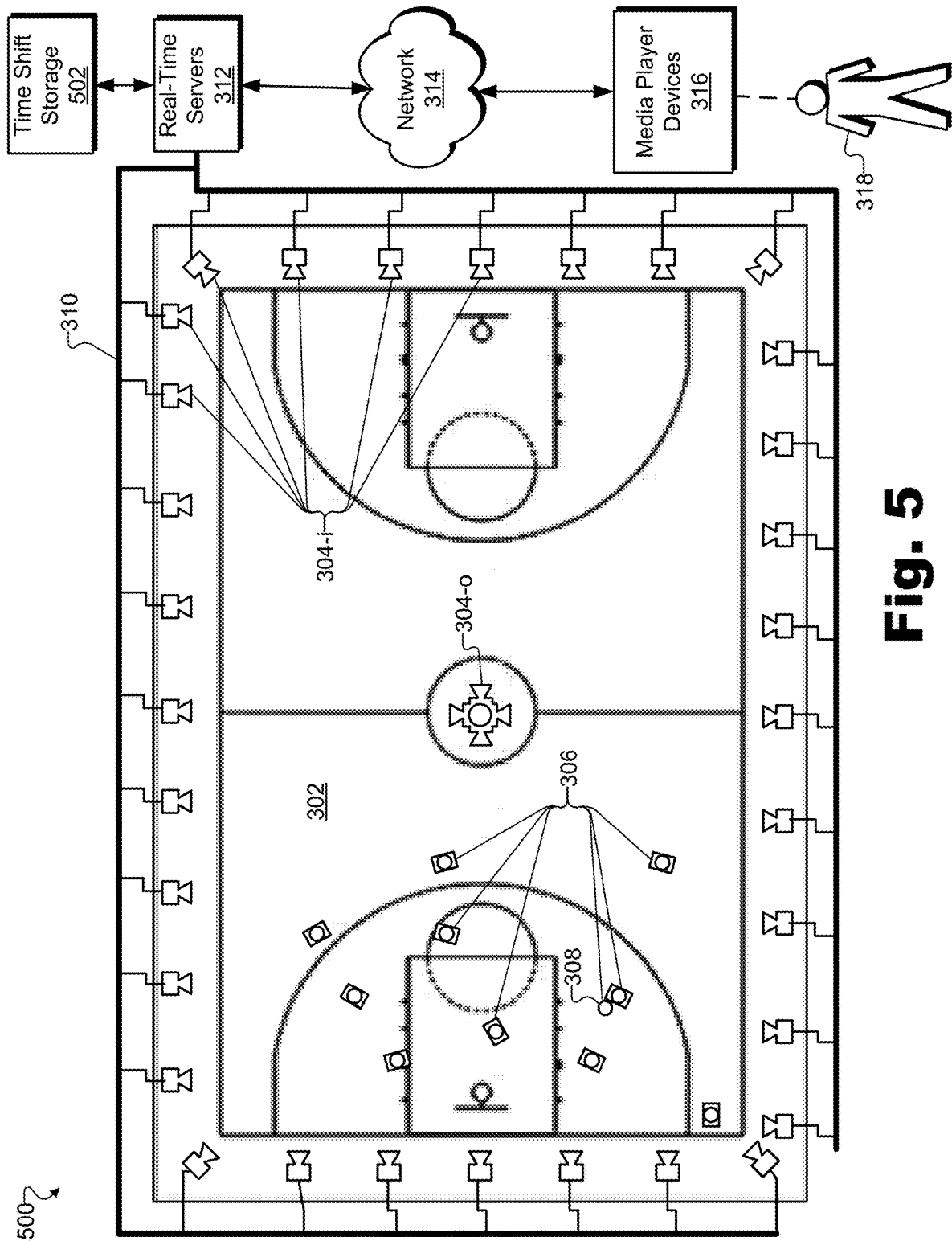
FIG. 5 illustrates an exemplary configuration in which the virtual reality media provider system of FIG. 1 operates to create a volumetric representation of an exemplary real-world event and provide time-shifted virtual reality media content representative of the real-world event according to principles described herein.

To illustrate, FIG. 5 shows an exemplary configuration 500 in which system 100 operates to create a volumetric representation of a real-world event (e.g., a basketball game) and to provide time-shifted virtual reality media content representative of the real-world event to media player device 316. As shown, configuration 500 includes all of the same elements discussed above in relation to configuration 300 of FIG. 3, but further includes a time shift storage 502 component. Time shift storage 502 may be implemented within system 100 (e.g., within storage facility 108). Additionally, while time shift storage 502 is illustrated as a stand-alone component in configuration 500, it will be understood that time shift storage 502 may be included within real-time servers 312 and/or or within any other server or system as may serve a particular implementation. When user 318 desires to experience a time-shifted, rather than a real time, version of the real-world event, system 100 (e.g., real-time servers 312) may request and receive data representative of the real-time volumetric data stream recorded in time shift storage 502 and provide virtual reality media content representative of the real-world event to media player device 316 in the same or a similar manner as if user 318 were experiencing the real-world event in real-time.

In certain examples, a real-world event may include a plurality of areas (e.g., geographical areas) of particular interest to users along with one or more areas of relatively less interest to users. As such, stage space 302 may include several distinct (i.e., non-touching) parts, and the dynamic volumetric model of the surfaces of the objects at the real-world event may include a plurality of distinct volumetric sub-models each corresponding to an area at the real-world event separated from other areas at the real-world event (e.g., areas that correspond to other volumetric sub-models of the dynamic volumetric model).

Figure 6:
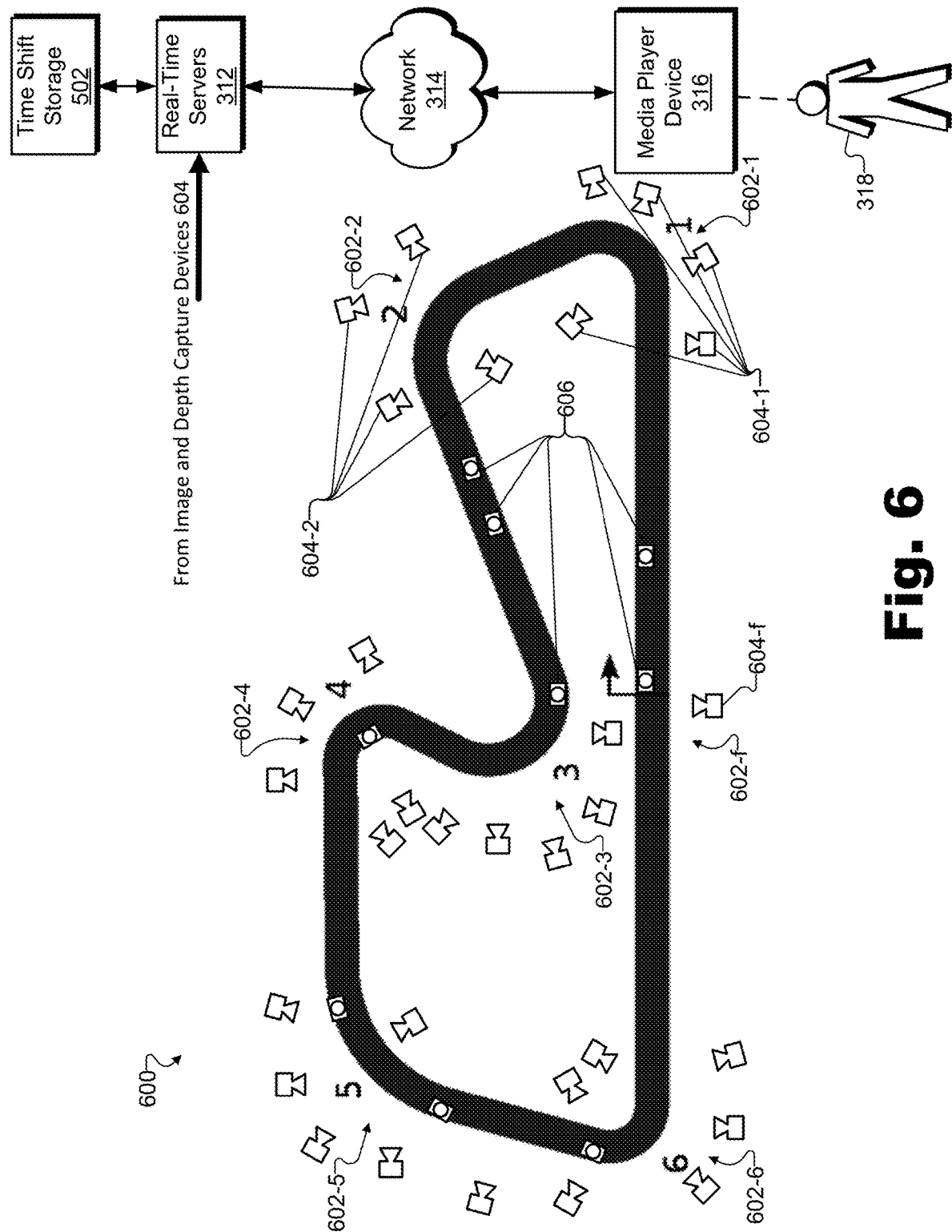
FIG. 6 illustrates an exemplary configuration in which the virtual reality media provider system of FIG. 1 operates to create a volumetric representation of an exemplary real-world event according to principles described herein.

To illustrate, FIG. 6 shows an exemplary configuration 600 in which system 100 operates to create a volumetric representation of an exemplary real-world event that includes a plurality of areas of particular interest. Specifically, as shown in configuration 600, the real-world event may be a race (e.g., a stock car race) at a racetrack. At such a real-world event, it may be undesirable to set up a sufficient configuration of synchronous video and depth capture devices to generate a real-time volumetric data stream representative of a dynamic volumetric model of all the surfaces of the objects around the entire racetrack (e.g., which may be several miles long). As a result, the virtual reality media provider may select and designate several distinct and non-contiguous areas of interest at the real-world event (e.g., particular curves of the racetrack, the finish line, etc.) as a stage space 602.

For example, as shown in configuration 600, stage space 602 may collectively refer to seven sub-stage spaces labeled in FIG. 6 as stage spaces 602-1 through 602-6 (corresponding to the six turns of the racetrack) and stage space 602-*f* (corresponding to the finish line). A plurality of video and depth capture devices 604 ("capture devices 604") may be positioned at fixed positions around the sub-stage space at each turn of the racetrack (e.g., capture devices 604-1 around stage space 602-1 at turn 1, capture devices 604-2 around stage space 602-2 at turn 2, and similar capture devices around stage spaces 602-3 through 602-6 at the other turns (not explicitly labeled in FIG. 6)) and around the sub-stage space at the finish line (e.g., capture device 604-*f* around stage space 602-*f*), and may be directed at the respective sub-stage spaces of stage space 602.

In FIG. 6, a plurality of objects 606 for whose surfaces 2D video data and depth data are captured and used to generate a real-time volumetric data stream may include stock cars racing around the racetrack, the racetrack itself, and other objects, scenery, and spectators around the racetrack. Real time servers 312 may receive the captured 2D video data and depth data from capture devices 604 (e.g., via wired, not explicitly shown in FIG. 6, or wireless communications, etc.) and process and store the real-time volumetric data stream, as well as generate and provide virtual reality media content based on the real-time volumetric data stream in operation with time shift storage 502, network 314, and/or media player device 316, as described above.

Figure 7:
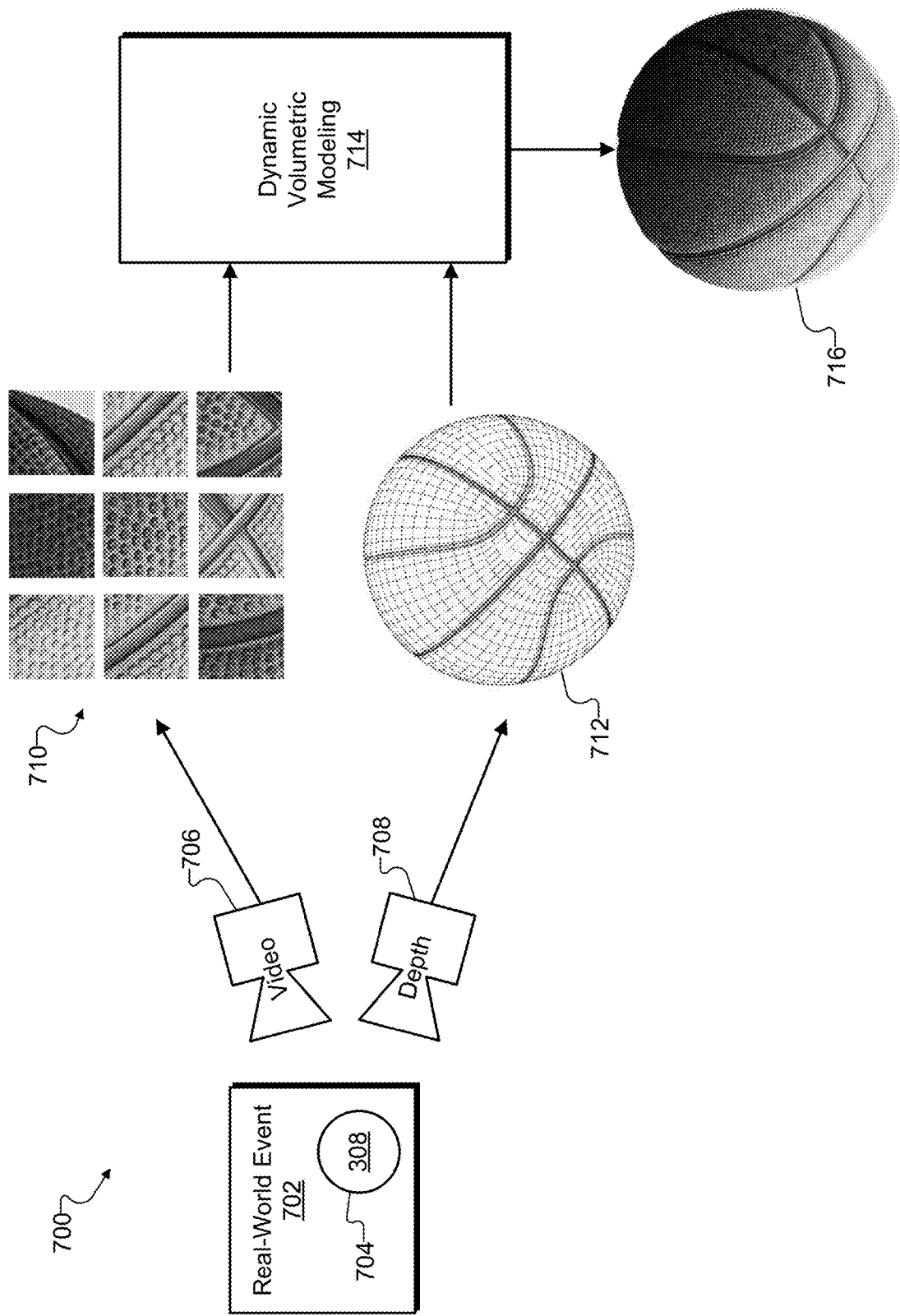
FIG. 7 illustrates an exemplary technique for creating a dynamic volumetric model of a surface of an exemplary object at an exemplary real-world event according to principles described herein.

An example will now be provided to illustrate how system 100 may capture 2D video data and depth data for surfaces of an object at a real-world event and then generate a real-time volumetric data stream including a dynamic volumetric model of the surfaces of the object at the real-world event. FIG. 7 illustrates an exemplary technique 700 for creating a dynamic volumetric model of a surface of an exemplary object (e.g., basketball 308 described above in relation to FIG. 3). As shown in FIG. 7, a real-world event 702 may include an object 704. A configuration of synchronous video capture devices 706 and a configuration of synchronous depth capture devices 708 may, respectively, capture 2D video data 710 and depth data 712 for the surface of object 704 at real-world event 702. For example, video capture devices 706 and depth capture devices 708 may be disposed at fixed positions surrounding object 704 at real-world event 702 such that 2D video data and depth data for the entire surface of object 704 (i.e., from every angle and vantage point) may be captured. 2D video data 710 and depth data 712 may then undergo dynamic volumetric modeling 714 to generate a dynamic volumetric model 716 (e.g., a 3D model) of object 704, which may be included with dynamic volumetric models of the surfaces of other objects at the real-world event in a real-time volumetric data stream representative of the real-world event.

Real-world event 702 may be any real-world event mentioned herein or that may serve a particular embodiment. To continue with the example presented above in relation to FIGS. 3 and 5, for example, real-world event 702 may be a basketball game. Similarly, object 704 may be any visible (i.e. nontransparent) object mentioned herein or that may otherwise be present at a real-world event. For example, object 704 may be animate (e.g., a person or an animal) or inanimate, a solid, a liquid, or a non-transparent gas (e.g., fog generated from a fog machine at a concert), etc. In this example, as shown, object 704 is basketball 308.

Video capture devices 706 and depth capture device 708 may be the same or similar to other video and depth capture devices described herein, such as capture devices 204, 304, and/or 604. While only one video capture device and one depth capture device is illustrated in FIG. 7, it will be understood that each capture device may represent a configuration of capture devices that may surround object 704 to capture data for the surface of object 704 from all sides (e.g., such as shown by capture devices 304 in FIG. 3). As shown, video capture devices 706 and depth capture devices 708 may be standalone capture devices (e.g., video cameras and 3D depth scanning devices, respectively). Alternatively, as described above, video capture devices 706 and depth capture devices 708 may be integrated into combination video-depth capture devices configured to capture both 2D video data and depth data using the same combination video-depth capture devices. In some examples, as mentioned above, depth data may be determined based solely on 2D video data (e.g., 2D video data from different vantage points) such that depth capture devices 708 may represent the same video cameras and/or other types of image capture devices represented by video capture devices 706.

2D video data 710 may be captured by video capture devices 706 and may include image or texture data representative of visible characteristics (e.g., color, shading, surface texture, etc.) of the surface of object 704 from all perspectives. For example, as illustrated in FIG. 7, 2D video data 710 may capture data representative of visible characteristics of various sections (e.g., small areas) of the surface of basketball 308 as the sections appear from various vantage points of various video capture devices 706. For illustrative purposes, 2D video data 710 in FIG. 7 shows a plurality of 2D images associated with various random sections of the surface of basketball 308 from a single vantage point. However, it will be understood that 2D video data 710 may include data associated with a plurality of vantage points surrounding basketball 308 and may be captured, packaged, stored, formatted, and transmitted in any way that may serve a particular embodiment. For example, 2D video data 710 may be delivered to dynamic volumetric modeling 714 with detailed information (e.g., metadata) indicating temporal and spatial information, such as when the 2D video data was captured, where the 2D video data was captured, etc.

Similarly, depth data 712 may be captured by depth capture devices 708 and may comprise depth data representative of spatial characteristics (e.g., locational coordinates, etc.) of the surface of object 704 from all perspectives. For example, as illustrated in FIG. 7, depth data 712 may include captured data representative of depth characteristics of various sections (e.g., small areas) of the surface of basketball 308 such that a wireframe model of basketball 308 may be generated (e.g., stitched together) based on the depth data captured from various vantage points associated with each depth capture device 708. Depth data 712 may be captured, packaged, stored, formatted, and transmitted in any way that may serve a particular embodiment. For example, depth data 712 may be delivered to dynamic volumetric modeling 714 with detailed information (e.g., metadata) indicating temporal and spatial information, such as when the depth data was captured, where the depth data was captured, etc.

Depth data 712 may be determined by depth capture devices 708 using any technique or modality that may serve a particular implementation. In particular, certain depth capture techniques may be used to increase the time efficiency of the depth capture (i.e., by minimizing capture and/or processing time) to facilitate generating dynamic volumetric models in real time.

For example, depth capture devices 708 may capture depth data 712 by using a stereoscopic triangulation depth capture technique. In this technique, depth capture devices 708 may be configured to capture 2D video data (i.e., depth capture devices 708 may be one and the same as video capture devices 706). The stereoscopic triangulation depth capture technique may include a first depth capture device 708 capturing 2D video data of points on the surface of object 704 from a first angle and a second depth capture device 708 capturing 2D video data of the points on the surface of object 704 from a second angle. The depth of the points on the surface of object 704 are triangulated based on the first angle, the second angle, and on a predetermined distance (i.e., a known distance based on the configuration of depth capture devices 708) between the first depth capture device 708 and the second depth capture device 708.

In the same or other examples, depth capture devices 708 may capture depth data 712 by using a time-of-flight depth capture technique. For example, depth capture devices 708 may use a radar-based ranging technique (e.g., laser radar) using electromagnetic pulses, a sonar-based ranging technique using sound pulses, and/or any other type of ranging technique as may serve a particular implementation. In the time-of-flight technique, each depth capture device 708 may generate a pulse (e.g., an electromagnetic pulse, a sound pulse, etc.) from a source associated with the depth capture device 708 at a particular time, and may be specially configured to measure a total transit time for the pulse to travel from the pulse source to points on the surface of object 704 (i.e., to travel to object 704), and, after being reflected by the surface of object 704, to travel from the points on the surface of object 704 to a pulse detector associated with the depth capture device 708 (i.e., to return back to the depth capture device 708). Based on the total transit time and the known speed of the pulse (e.g., the speed of light, the speed of sound, etc.), a depth of each of the points on the surface of object 704 may thus be determined.

In the same or other examples, depth capture devices 708 may capture depth data 712 by using an infrared pattern analysis depth capture technique. In this technique, an infrared pattern emitter device (i.e., associated with or separate from depth capture devices 708) may project a random scatter (i.e., a pattern) of randomly-sized infrared dots onto surfaces of various objects at real-world event 702, including object 704. A first depth capture device 708 may be configured with infrared sensing capability such that the first depth capture device 708 may detect the random scatter of randomly-sized infrared dots projected onto the surfaces of the objects from a first angle. Similarly, a second depth capture device 708 similarly configured with infrared sensing capability may detect the random scatter of randomly-sized infrared dots projected onto the surfaces of the objects from a second angle. The depth of the surfaces of the objects may then be triangulated based on the first angle, the second angle, and on a predetermined distance (i.e., a known distance based on the configuration of depth capture devices 708) between the first depth capture device 708 and the second depth capture device 708.

Because real-time depth detection in a non-controlled, real-world environment may be difficult and inexact, in some examples, a plurality of different depth capture techniques may be employed (e.g., such as the depth capture techniques described above). Subsequently, depth data obtained using each of the depth capture techniques employed may be combined to determine the most accurate depth data for objects within real-world event 702 possible.

Once 2D video data 710 and depth data 712 have been captured, dynamic volumetric modeling 714 may process 2D video data 710 together with depth data 712 to generate dynamic volumetric model 716 of object 704 in any suitable way. For example, dynamic volumetric modeling 714 may combine depth data 712 (e.g., using temporal and spatial metadata included with depth data 712) to create (e.g., stitch together) a wireframe model of basketball 308, as shown in the drawing representing depth data 712. Dynamic volumetric modeling 714 may then map 2D video data 710 onto the wireframe model by matching temporal and spatial metadata included with 2D video data 710 with the temporal and spatial information included with depth data 712.

In this way, dynamic volumetric modeling 714 may generate dynamic volumetric model 716 (e.g., a 3D model) of object 704 from 2D video data 710 and depth data 712. Dynamic volumetric model 716 may be included with dynamic volumetric models of the surfaces of other objects at real-world event 702 in a real-time volumetric data stream representative of real-world event 702. However, each dynamic volumetric model of each object within real-world event 702 may be individually and independently manipulable (e.g., processable) in relation to the other dynamic volumetric models of the other objects at real-world event 702. Accordingly, based on the real-time volumetric data stream including dynamic volumetric model 716 and other dynamic volumetric models for other objects at real-world event 702, virtual reality media content may be generated and provided such that a user may view real-world event 702 in real time from any arbitrary location at real-world event 702. By generating distinct, individually-manipulable volumetric models of each object within real-world event 702 by combining depth data to generate wireframe models of individual objects at specific points in space at real-world event 702 and mapping 2D video data onto the wireframe models to create dynamic volumetric models of the objects at real-world event 702, virtual reality media content may be generated and provided as experienced from viewpoints of real-world event 702 that may not be possible (or may be extremely inefficient and/or processing intensive) by combining 2D video data alone.

Figure 8:
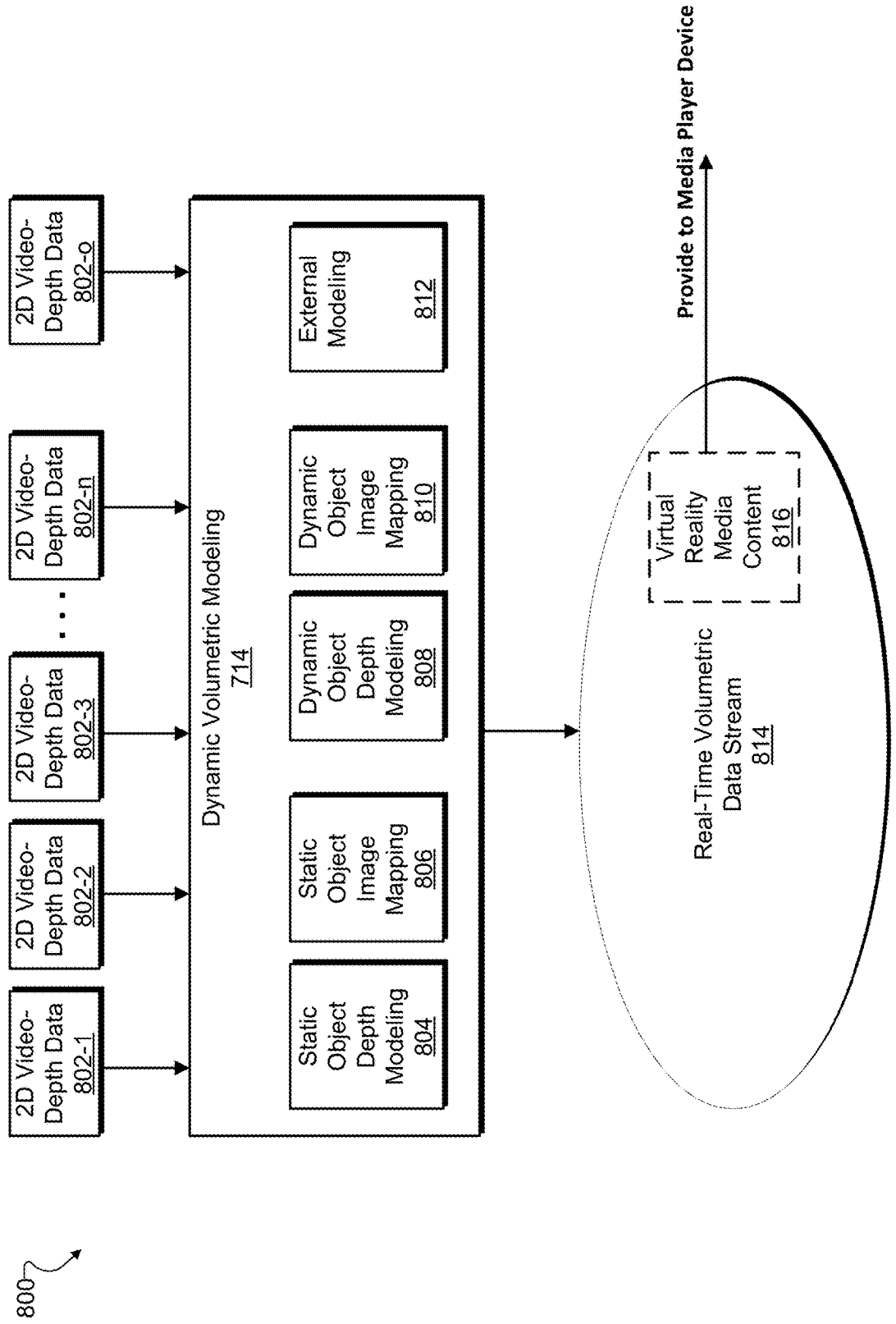
FIG. 8 illustrates an exemplary dataflow for creating and providing a real-time volumetric representation of a real-world event according to principles described herein.

FIG. 8 illustrates an exemplary dataflow 800 for creating and providing a real-time volumetric representation of a real-world event (e.g., real-world event 702). The data in dataflow 800 may be generated, processed, distributed, etc., in any way described herein or as may serve a particular implementation. As shown in FIG. 8, 2D video-depth data 802 (e.g., 2D video-depth data 802-1 through 802-n and 802-o) may flow into dynamic volumetric modeling 714, where static object depth modeling 804, static object image mapping 806, dynamic object depth modeling 808, dynamic object image mapping 810, and external modeling 812 may process 2D video-depth data 802 to generate a real-time volumetric data stream 814. In real time, virtual reality media content 816, which may be generated based on real-time volumetric data stream 814, may then be provided to a media player device.

2D video-depth data 802 may represent captured 2D video data and captured depth data from a plurality of video and depth capture devices such as capture devices 204 (see FIG. 2), capture devices 304 (see FIGS. 3 and 5), capture devices 604 (see FIG. 6), or capture devices 706 and 708 (see FIG. 7). For example, 2D video-depth data 802-1 may include 2D video data (e.g., similar to 2D video data 710) and depth data (e.g., similar to depth data 712) captured by a first video and depth capture device, 2D video-depth data 802-2 may include 2D video data and depth data captured by a second video and depth capture device (e.g., a video and depth capture device capturing data representative of objects from a different vantage point than the first video and depth capture device), and so forth for 2D video-depth data 802-3 through 802-n. 2D video-depth data 802-o may include 2D video data and/or depth data captured by an outward facing video and depth capture device (e.g., a 360-degree outward facing synchronous video and depth capture device such as capture device 304-o in FIG. 3).

As described above in relation to FIG. 7, dynamic volumetric modeling 714 may perform data processing on 2D video-depth data 802 to generate a real-time volumetric data stream representative of a dynamic volumetric model of the surfaces of the objects at the real-world event. More specifically, dynamic volumetric modeling 714 may generate a dynamic volumetric model of the surfaces of at least three categories of objects: 1) static objects at the real-world event (e.g., a floor of a basketball court, basketball standards, etc.), 2) dynamic objects at the real-world event (e.g., players and referees moving around on the basketball court, a basketball being used by the players in a basketball game, etc.), and 3) external objects at the real-world event (e.g., objects outside the basketball court stage space such as spectators watching the basketball game, etc.). As mentioned above and as will be described in more detail below, system 100 may obtain significant efficiency gains by differentiating these categories of objects and generating a real-time volumetric data stream representative of dynamic volumetric models of the surfaces of the objects at the real-world event separately, rather than treating the different categories of objects equally. For example, by differentiating static, dynamic, and external objects as described below, system 100 may obtain efficiency gains that facilitate and/or enable system 100 to perform the immense processing required to generate and provide the real-time volumetric data stream representative of the dynamic volumetric models of the surfaces of the objects at the real-world event in real time.

Static object depth modeling 804 may model (e.g., create wireframe depth models) one or more static objects at the real-world event based on depth data within 2D video-depth data 802. For example, static object depth modeling 804 may determine, based on depth data, that a basketball standard is statically located at a particular location in the space above the basketball court, that the basketball standard is distinct from players and/or a basketball that may occasionally touch the basketball standard, and that the basketball standard is distinct from other objects seen behind the basketball standard (e.g., in the background) when the basketball standard is viewed from different vantage points. With these determinations, static object depth modeling 804 may generate a depth model (e.g., a wireframe model) of the basketball standard that may not yet include any color or video data, but that may represent a location in a 3D space representative of the real-world event where the basketball standard is positioned.

Static object image mapping 806 may map textures, colors, etc. onto the depth model of static objects (e.g., the basketball standard) generated by static object depth modeling 804. For example, static object image mapping 806 may map the textures, colors, and so forth based on 2D video data within 2D video-depth data 802. As such, complete dynamic volumetric models of the static objects may be included within real-time volumetric data stream 814. Because the static objects may not change often or at all, dynamic volumetric models of the static objects may be processed and updated irregularly or on an as-needed basis in order to conserve processing resources in system 100.

Dynamic object depth modeling 808 and dynamic object image mapping 810 may perform similar respective functions as static object depth modeling 804 and static object image mapping 806 for dynamic objects (e.g., objects determined to be dynamically moving in real time). However, because the dynamic object may be continuously in flux (e.g., moving around within the stage space of the real-world event), dynamic volumetric models of the dynamic objects may be updated much more regularly in order to keep the real-time volumetric data stream up-to-date with what is occurring at the real-world event.

External modeling 812 also may perform similar functions as the depth modeling and image mapping operations described above for external objects (e.g., background objects that are not within the stage space) such as those represented in 2D video-depth data 802-*o*. Because the external objects may add ambience and realism to a virtual reality experience but may not be a primary focus of the experience for many users, external modeling 812 may update models for external objects irregularly. Additionally, because 2D video-depth data 802-*o* may include captured data from only one or a limited number of vantage points (i.e., vantage points that do not surround the external objects to capture data from every vantage point), external modeling 812 may generate a 2D model (e.g., that incorporates little or no depth data but is just based on 2D video data) of the external objects, or a volumetric model that includes less detail than the volumetric models of, for example, the dynamic objects within the stage space of the real-world event.

Real-time volumetric data stream 814 may include models (e.g., dynamic volumetric models, 2D models, etc.) of each of the static objects, dynamic objects, and external objects at the real-world event. Put another way, real-time volumetric data stream 814 may be representative of a dynamic volumetric model of the surfaces of some or all of the objects at the real-world event. Accordingly, virtual reality media content 816 may be provided based on real-time volumetric data stream 814 to present a dynamically selectable viewpoint of the real-world event corresponding to an arbitrary location (e.g., an arbitrary location within the stage space) at the real-world event.

Figure 9:
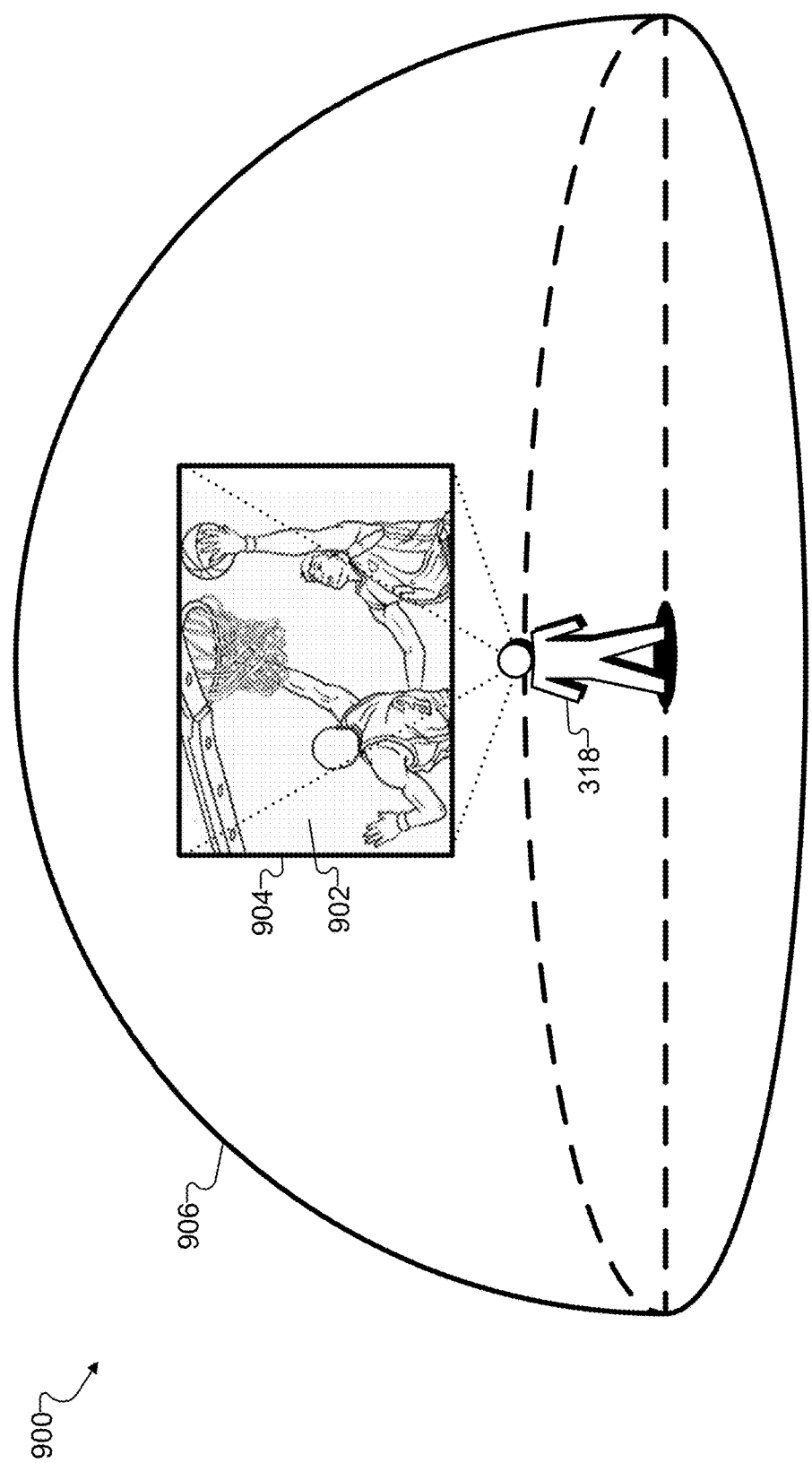
FIG. 9 illustrates an exemplary virtual reality experience in which a user is presented with exemplary virtual reality media content representative of a real-world event as experienced from a dynamically selectable viewpoint corresponding to an exemplary arbitrary location at the real-world event according to principles described herein.

To illustrate, FIG. 9 shows an exemplary virtual reality experience 900 in which user 318 is presented with exemplary virtual reality media content 902 representative of a real-world event as experienced from a dynamically selectable viewpoint corresponding to an exemplary arbitrary location at the real-world event. Specifically, virtual reality media content 902 is presented within a field of view 904 that shows the real-world event from a viewpoint corresponding to an arbitrary location right underneath a basketball standard at the real-world event where a shot is being made. An immersive virtual reality world 906 based on the real-world event may be available for the viewer to experience by providing user input (e.g., head movements, keyboard input, etc.) to look around and/or to move around (i.e., dynamically select a viewpoint from which to experience) immersive virtual reality world 906.

In FIG. 9, immersive virtual reality world 906 is illustrated as a semi-sphere, indicating that user 318 may look in any direction within immersive virtual reality world 906 that is substantially forward, backward, left, right, and/or up from the viewpoint of the location under the basketball standard that user 318 has currently selected. In other examples, immersive virtual reality world 906 may include an entire 360-degree by 180-degree sphere such that user 318 may also look down. Additionally, user 318 may move around to other locations within immersive virtual reality world 906 (i.e., dynamically selecting different dynamically selectable viewpoints of the real-world event). For example, user 318 may select a viewpoint at half court, a viewpoint from the free-throw line facing the basketball standard, a viewpoint suspended above the basketball standard, or the like.

Figure 10:
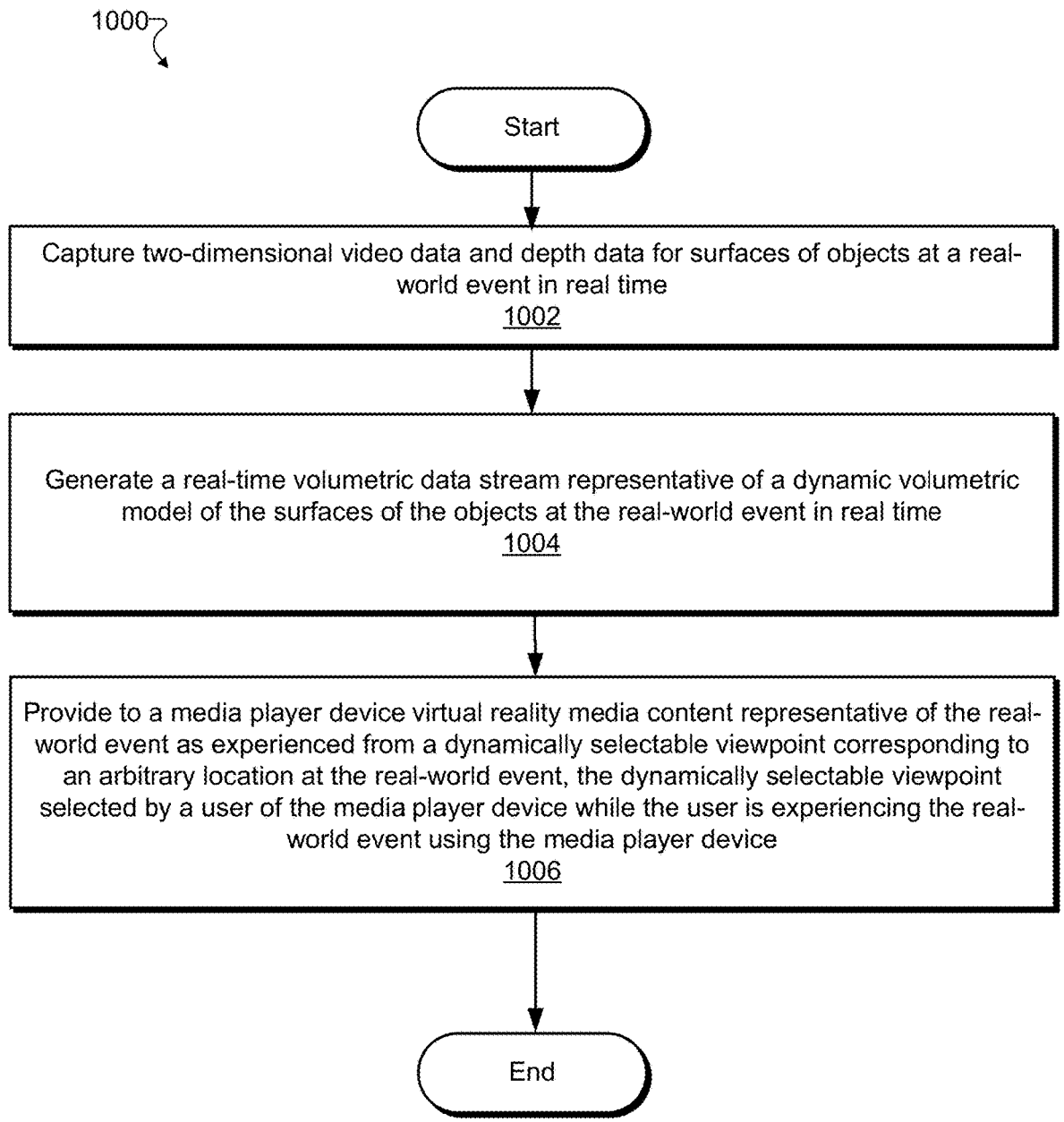
FIGS. 10 and 11 illustrate exemplary methods for creating and providing a real-time volumetric representation of a real-world event according to principles described herein.

FIG. 10 illustrates an exemplary method 1000 for creating and providing a real-time volumetric representation of a real-world event. While FIG. 10 illustrates exemplary operations according to one embodiment, other embodiments may omit, add to, reorder, and/or modify any of the operations shown in FIG. 10. One or more of the operations shown in FIG. 10 may be performed by system 100 and/or any implementation thereof.

In operation 1002, a virtual reality media provider system that includes a configuration of synchronous video and depth capture devices disposed at fixed positions at a real-world event may capture 2D video data and depth data for surfaces of objects at the real-world event. In some examples, the virtual reality media provider system may capture the 2D video data and depth data in real time. Operation 1002 may be performed in any of the ways described herein.

In operation 1004, the virtual reality media provider system may generate a real-time volumetric data stream representative of a dynamic volumetric model of the surfaces of the objects at the real-world event. In some examples, the virtual reality media provider system may generate the real-time volumetric data stream in real time based on the captured depth data and the captured two-dimensional video data captured in operation 1002. Additionally, in certain examples, the dynamic volumetric model of the surfaces of the objects at the real-world event may be configured to be used to generate virtual reality media content representative of the real-world event as experienced from a dynamically selectable viewpoint corresponding to an arbitrary location at the real-world event, the dynamically selectable viewpoint selected by a user of a media player device while the user is experiencing the real-world event using the media player device. Operation 1004 may be performed in any of the ways described herein.

In operation 1006, the virtual reality media provider system may provide virtual reality media content representative of the real-world event to a media player device associated with a user. In some examples, the provided virtual reality media content may be representative of the real-world event as experienced from a dynamically selectable viewpoint corresponding to an arbitrary location at the real-world event. The dynamically selectable viewpoint may be selected by a user of the media player device while the user is experiencing the real-world event using the media player device. The virtual reality media provider system may provide the virtual reality media content in real time based on the real-time volumetric data stream generated in operation 1004. Operation 1006 may be performed in any of the ways described herein. For example, operation 1006 may be performed by the virtual reality media provider system or by a separate system (e.g., by another system operated by the virtual reality media provider or by a virtual reality media content distributor associated with the virtual reality media provider) that receives the virtual reality media content from the virtual reality media provider system and/or distributes the virtual reality media content under direction of the virtual reality media provider system.

Figure 11:
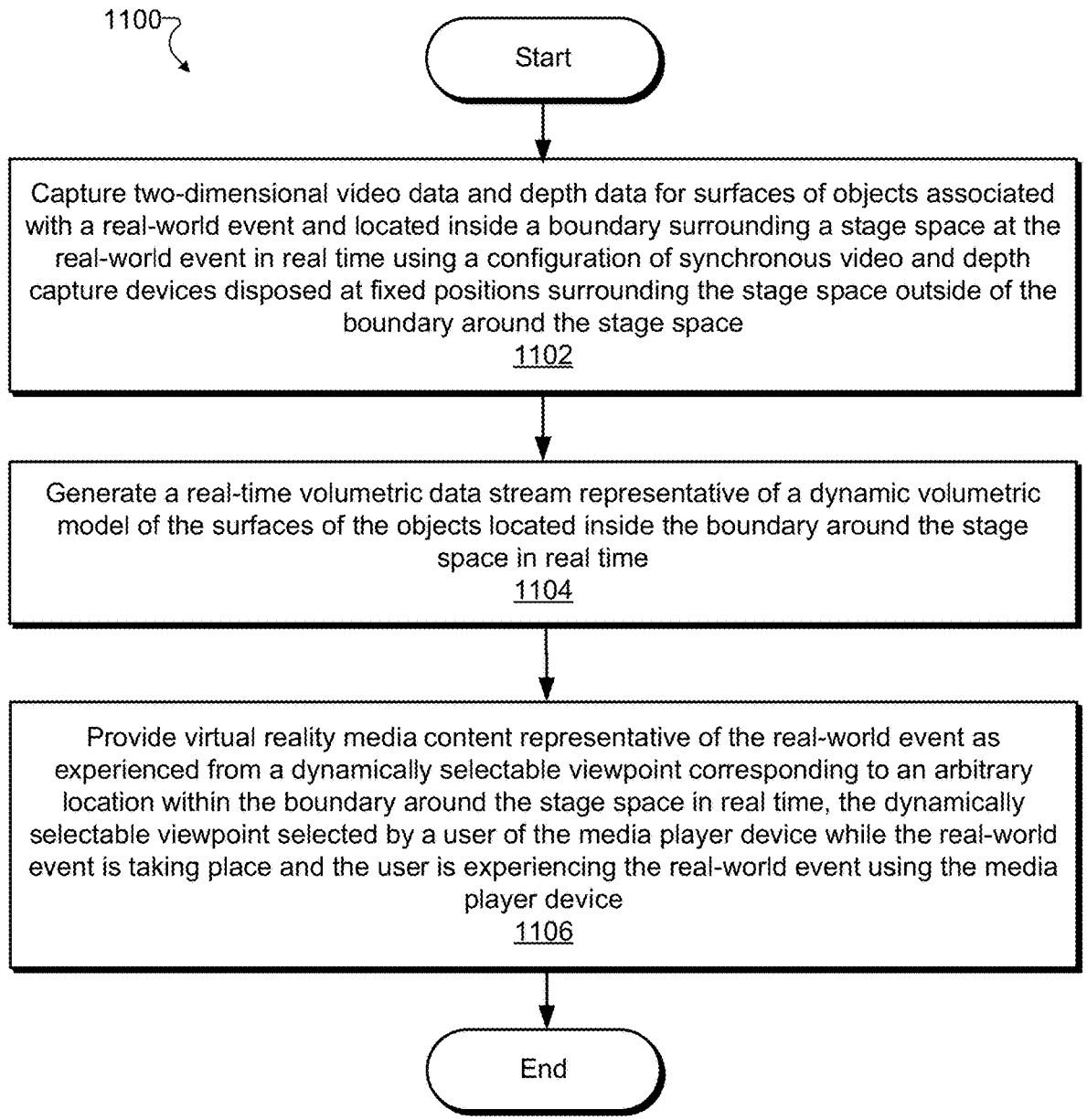

FIG. 11 illustrates an exemplary method 1100 for creating and providing a real-time volumetric representation of a real-world event. While FIG. 11 illustrates exemplary operations according to one embodiment, other embodiments may omit, add to, reorder, and/or modify any of the operations shown in FIG. 11. One or more of the operations shown in FIG. 11 may be performed by system 100 and/or any implementation thereof.

In operation 1102, a virtual reality media provider system that includes a configuration of synchronous video and depth capture devices disposed at fixed positions surrounding a stage space where a real-world event is taking place and outside of a boundary around the stage space may capture 2D video data and depth data for surfaces of objects located inside the boundary and associate with the real-world event taking place within the stage space. In some examples, the virtual reality media provider system may capture the 2D video data and depth data in real time. Operation 1102 may be performed in any of the ways described herein.

In operation 1104, the virtual reality media provider system may generate a real-time volumetric data stream representative of a dynamic volumetric model of the surfaces of the objects located inside the boundary around the stage space. For example, the virtual reality media provider system may generate the real-time volumetric data stream in real time based on the captured depth data and the captured two-dimensional video data captured in operation 1102. Operation 1104 may be performed in any of the ways described herein.

In operation 1106, the virtual reality media provider system may provide virtual reality media content representative of the real-world event to a media player device. For example, the virtual reality media content may be representative of the real-world event as experienced from a dynamically selectable viewpoint corresponding to an arbitrary location within the boundary around the stage space where the real-world event is taking place. The dynamically selectable viewpoint may be selected by a user of the media player device while the real-world event is taking place and the user is experiencing the real-world event using the media player device. In some examples, operation 1106 may be performed in real time based on the real-time volumetric data stream generated in operation 1104. Operation 1106 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
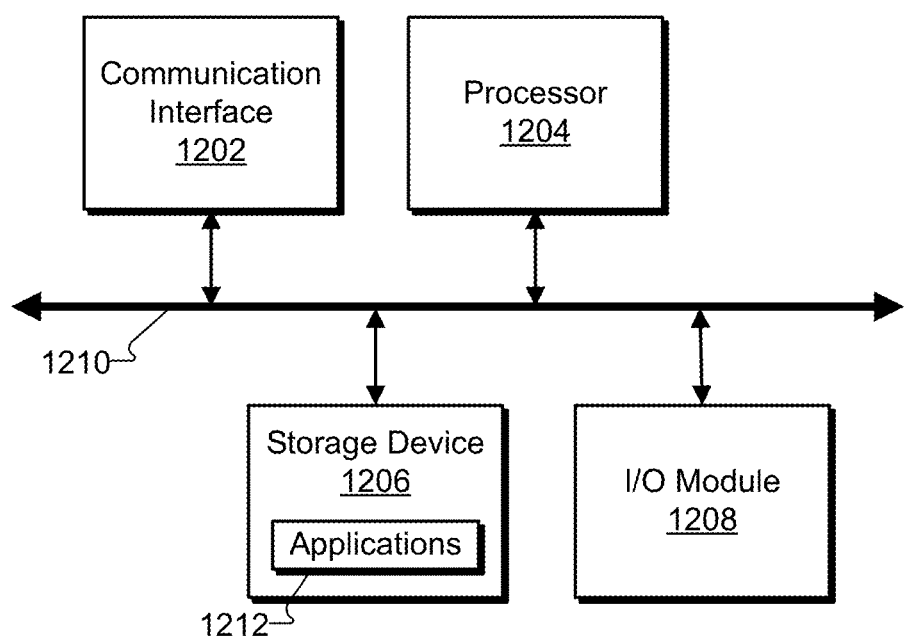
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual reality experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with data capture facility 102, data processing facility 104, or data distribution facility 106 of system 100 (see FIG. 4). Likewise, storage facility 108 of system 100 may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   capturing, by a virtual reality media provider system, two-dimensional video data depicting a static object and a dynamic object;
   capturing, by the virtual reality media provider system using a plurality of different depth capture techniques, depth data spatially characterizing a surface of the dynamic object;
   combining, by the virtual reality media provider system, the depth data captured using the plurality of different depth capture techniques;
   differentiating, by the virtual reality media provider system, the static object depicted in the two-dimensional video data from the dynamic object depicted in the two-dimensional video data;
   generating, by the virtual reality media provider system and based on the two-dimensional video data and the combined depth data, a dynamic volumetric model of a surface of the static object and a dynamic volumetric model of the surface of the dynamic object;
   updating, by the virtual reality media provider system and with a lower regularity or on an as-needed basis, the dynamic volumetric model of the surface of the static object; and
   separately updating, by the virtual reality media provider system and with a higher regularity that is higher than the lower regularity and that keeps the dynamic volumetric model of the surface of the dynamic object up-to-date with what is occurring in the two-dimensional video data, the dynamic volumetric model of the surface of the dynamic object.

2. The method of claim 1, wherein the two-dimensional video data is captured video data depicting a real-world event, the captured video data captured by a configuration of synchronous video cameras disposed at fixed positions at the real-world event.

3. The method of claim 2, further comprising:
   generating, by the virtual reality media provider system, a real-time volumetric data stream representative of the dynamic volumetric models of the surfaces of the static object and the dynamic object; and
   providing, by the virtual reality media provider system to a media player device and based on the real-time volumetric data stream, virtual reality media content representative of the real-world event as experienced from a dynamically selectable viewpoint corresponding to an arbitrary location at the real-world event;
   wherein the dynamically selectable viewpoint is selectable by a user of the media player device while the user is experiencing the real-world event using the media player device.

4. The method of claim 2, wherein:
the capturing of the depth data is performed by a configuration of synchronous depth capture devices disposed, together with the synchronous video cameras, at the fixed positions at the real-world event; and
the depth data further spatially characterizes the surface of the static object.

5. The method of claim 4, wherein the generating of the dynamic volumetric model of the surface of the static object comprises:
determining, based on the combined depth data characterizing the surface of the static object, that the static object is statically located at a particular location at the real-world event, and that the static object is distinct from the dynamic object;
generating, based on the determining that the static object is statically located at the particular location and is distinct from the dynamic object, a wireframe depth model of the static object, the wireframe depth model representing a location in a three-dimensional space representative of the real-world event where the static object is positioned; and
mapping, based on the two-dimensional video data depicting the static object, textures and colors onto the wireframe depth model of the static object.

6. The method of claim 4, wherein the generating of the dynamic volumetric model of the surface of the dynamic object comprises:
determining, based on the combined depth data characterizing the surface of the dynamic object, that the dynamic object is continuously moving around at the real-world event, and that the dynamic object is distinct from the static object;
generating, based on the determining that the dynamic object is continuously moving around at the real-world event and is distinct from the static object, a wireframe depth model of the dynamic object, the wireframe depth model representing positions on a path moved along by the dynamic object through a three-dimensional space representative of the real-world event; and
mapping, based on the two-dimensional video data depicting the dynamic object, textures and colors onto the wireframe depth model of the dynamic object.

7. The method of claim 2, wherein:
the fixed positions at the real-world event where the synchronous video cameras are disposed include fixed positions outside of a stage space where the real-world event is taking place and that are directed at the stage space;
the static and dynamic objects at the real-world event are located within the stage space;
the fixed positions at the real-world event where the synchronous video cameras are disposed further include a fixed position that is within the stage space and at which an outward-facing video camera is disposed, the outward-facing video camera configured to capture two-dimensional video data for surfaces of external objects at the real-world event that are outside of the stage space; and
the method further comprises
differentiating, by the virtual reality media provider system, the external objects in the two-dimensional video data from the static object and the dynamic object in the two-dimensional video data, and
generating, by the virtual reality media provider system and based on the differentiating of the external objects from the static object and the dynamic object, a two-dimensional representation of the surfaces of the external objects.

8. The method of claim 1, wherein the differentiating of the static object from the dynamic object, the generating of the dynamic volumetric models, and the updating and separately updating of the dynamic volumetric models are performed by the virtual reality media provider system in real time.

9. A system comprising:
a configuration of video cameras that capture two-dimensional video data depicting a static object and a dynamic object;
a configuration of depth capture devices that capture, using a plurality of different depth capture techniques, depth data spatially characterizing a surface of the dynamic object;
a memory storing instructions; and
a processor communicatively coupled to the memory and configured to execute the instructions to:
combine the depth data captured using the plurality of different depth capture techniques,
differentiate the static object depicted in the two-dimensional video data from the dynamic object depicted in the two-dimensional video data,
generate, based on the two-dimensional video data and the combined depth data, a dynamic volumetric model of a surface of the static object and a dynamic volumetric model of the surface of the dynamic object,
update, with a lower regularity or on an as-needed basis, the dynamic volumetric model of the surface of the static object, and
separately update, with a higher regularity that is higher than the lower regularity and that keeps the dynamic volumetric model of the surface of the dynamic object up-to-date with what is occurring in the two-dimensional video data, the dynamic volumetric model of the surface of the dynamic object.

10. The system of claim 9, wherein the configuration of video cameras is a configuration of synchronous video cameras disposed at fixed positions at a real-world event, and the two-dimensional video data is captured video data depicting the real-world event.

11. The system of claim 10, wherein the processor is further configured to execute the instructions to:
generate a real-time volumetric data stream representative of the dynamic volumetric models of the surfaces of the static object and the dynamic object; and
provide, to a media player device and based on the real-time volumetric data stream, virtual reality media content representative of the real-world event as experienced from a dynamically selectable viewpoint corresponding to an arbitrary location at the real-world event, the dynamically selectable viewpoint selectable by a user of the media player device while the user is experiencing the real-world event using the media player device.

12. The system of claim 10, wherein:
the configuration of depth capture devices is a configuration of synchronous depth capture devices disposed, together with the synchronous video cameras, at the fixed positions at the real-world event; and
the depth data further spatially characterizes the surface of the static object.

13. The system of claim 12, wherein the generating of the dynamic volumetric model of the surface of the static object comprises:
- determining, based on the combined depth data characterizing the surface of the static object, that the static object is statically located at a particular location at the real-world event, and that the static object is distinct from the dynamic object;
- generating, based on the determining that the static object is statically located at the particular location and is distinct from the dynamic object, a wireframe depth model of the static object, the wireframe depth model representing a location in a three-dimensional space representative of the real-world event where the static object is positioned; and
- mapping, based on the two-dimensional video data depicting the static object, textures and colors onto the wireframe depth model of the static object.

14. The system of claim 12, wherein the generating of the dynamic volumetric model of the surface of the dynamic object comprises:
- determining, based on the combined depth data characterizing the surface of the dynamic object, that the dynamic object is continuously moving around at the real-world event, and that the dynamic object is distinct from the static object;
- generating, based on the determining that the dynamic object is continuously moving around at the real-world event and is distinct from the static object, a wireframe depth model of the dynamic object, the wireframe depth model representing positions on a path moved along by the dynamic object through a three-dimensional space representative of the real-world event; and
- mapping, based on the two-dimensional video data depicting the dynamic object, textures and colors onto the wireframe depth model of the dynamic object.

15. The system of claim 10, wherein:
- the fixed positions at the real-world event where the synchronous video cameras are disposed include fixed positions outside of a stage space where the real-world event is taking place and that are directed at the stage space;
- the static and dynamic objects at the real-world event are located within the stage space;
- the fixed positions at the real-world event where the synchronous video cameras are disposed further include a fixed position that is within the stage space and at which an outward-facing video camera is disposed, the outward-facing video camera configured to capture two-dimensional video data for surfaces of external objects at the real-world event that are outside of the stage space; and
- the processor is further configured to execute the instructions to
  - differentiate the external objects in the two-dimensional video data from the static object and the dynamic object in the two-dimensional video data, and
  - generate, based on the differentiating of the external objects from the static object and the dynamic object, a two-dimensional representation of the surfaces of the external objects.

16. The system of claim 9, wherein the processor is configured to differentiate the static object from the dynamic object, generate the dynamic volumetric models, and update and separately update the dynamic volumetric models in real time.

17. A non-transitory computer-readable medium storing instructions that, when executed, direct a processor of a computing device to:
- direct a configuration of video cameras to capture two-dimensional video data depicting a static object and a dynamic object;
- direct a configuration of depth capture devices to capture, using a plurality of different depth capture techniques, depth data spatially characterizing a surface of the dynamic object;
- combine the depth data captured using the plurality of different depth capture techniques;
- differentiate the static object depicted in the two-dimensional video data from the dynamic object depicted in the two-dimensional video data;
- generate, based on the two-dimensional video data and the combined depth data, a dynamic volumetric model of a surface of the static object and a dynamic volumetric model of the surface of the dynamic object;
- update, with a lower regularity or on an as-needed basis, the dynamic volumetric model of the surface of the static object; and
- separately update, with a higher regularity that is higher than the lower regularity and that keeps the dynamic volumetric model of the surface of the dynamic object up-to-date with what is occurring in the two-dimensional video data, the dynamic volumetric model of the surface of the dynamic object.

18. The non-transitory computer-readable medium of claim 17, wherein the configuration of video cameras is a configuration of synchronous video cameras disposed at fixed positions at a real-world event, and the two-dimensional video data is captured video data depicting the real-world event.

19. The non-transitory computer-readable medium of claim 18, wherein the instructions further direct the processor to:
- generate a real-time volumetric data stream representative of the dynamic volumetric models of the surfaces of the static object and the dynamic object; and
- provide, to a media player device and based on the real-time volumetric data stream, virtual reality media content representative of the real-world event as experienced from a dynamically selectable viewpoint corresponding to an arbitrary location at the real-world event, the dynamically selectable viewpoint selectable by a user of the media player device while the user is experiencing the real-world event using the media player device.

20. The non-transitory computer-readable medium of claim 18, wherein:
- the configuration of depth capture devices is a configuration of synchronous depth capture devices disposed, together with the synchronous video cameras, at the fixed positions at the real-world event; and
- the depth data further spatially characterizes the surface of the static object.

* * * * *